United States Patent [19]
Meloni

[11] Patent Number: 5,768,988
[45] Date of Patent: Jun. 23, 1998

[54] COMPACTING DEVICE FOR INORGANIC SOLID URBAN WASTE

[75] Inventor: Gianfranco Meloni, Selargius, Italy

[73] Assignee: Tecnova S.r.l., Italy

[21] Appl. No.: 618,556

[22] Filed: Mar. 20, 1996

[30] Foreign Application Priority Data

Mar. 24, 1995 [IT] Italy ................................. AL9500001

[51] Int. Cl.[6] ..................................................... B30B 9/30
[52] U.S. Cl. .......................... 100/229 A; 100/246; 53/527
[58] Field of Search ..................................... 100/219, 220, 100/226, 229 A, 240, 245, 246; 53/527

[56] References Cited

U.S. PATENT DOCUMENTS

| | | |
|---|---|---|
| 3,861,117 | 1/1975 | DeFilippi ............................. 100/229 A |
| 3,882,771 | 5/1975 | Frohbieter ................................ 100/246 |
| 3,995,543 | 12/1976 | Montalbano ........................ 100/229 A |
| 4,073,229 | 2/1978 | O'Rourke et al. .................. 100/229 A |
| 4,241,652 | 12/1980 | Smedlund . |
| 4,286,515 | 9/1981 | Baumann et al. ....................... 100/245 |
| 4,996,918 | 3/1991 | Carter et al. . |
| 5,172,630 | 12/1992 | Thompson . |
| 5,447,017 | 9/1995 | Becher et al. . |

FOREIGN PATENT DOCUMENTS

| | | |
|---|---|---|
| 2158908 | 6/1973 | France . |
| 2 380 103 | 9/1978 | France . |
| 2 234 977 | 11/1974 | Germany . |
| 27 24 963 | 12/1977 | Germany . |
| 43 13 764 | 11/1993 | Germany . |
| 93 11 662 | 11/1993 | Germany . |
| 93 15 201 | 3/1994 | Germany . |
| 93 16 074 | 3/1994 | Germany . |
| 43 21 784 | 1/1995 | Germany . |
| 8003555 | 1/1982 | Netherlands ............................. 53/527 |
| 550 657 | 6/1974 | Switzerland . |
| 2003483 | 8/1971 | United Kingdom ................... 100/226 |
| 1 405 181 | 9/1975 | United Kingdom . |

OTHER PUBLICATIONS

Patent Abstracts of Japan, vol. 018, No. 529 (M–1684), 6 Oct. 1994 & JP–A–06 183507 (Sekisui Chem Co Ltd), 5 Jul. 1994 *abstract; figures*.

Patent Abstracts of Japan, vol. 95, No. 001 & JP–A–07 024431 (Nikkiso Co Ltd), 27 Jan. 1995, *abstract; figures*.

*Primary Examiner*—Stephen F. Gerrity
*Attorney, Agent, or Firm*—Larson & Taylor

[57] ABSTRACT

A compacting device has a modular-type structure and limited dimensions typical of usual household appliances for personal and private use. The configuration of the compacting device may vary from a minimum structure having at least a motor or hand-operated compacting unit which can be coupled with at least a waste collection and compaction container, to more and more complex structures.

4 Claims, 26 Drawing Sheets

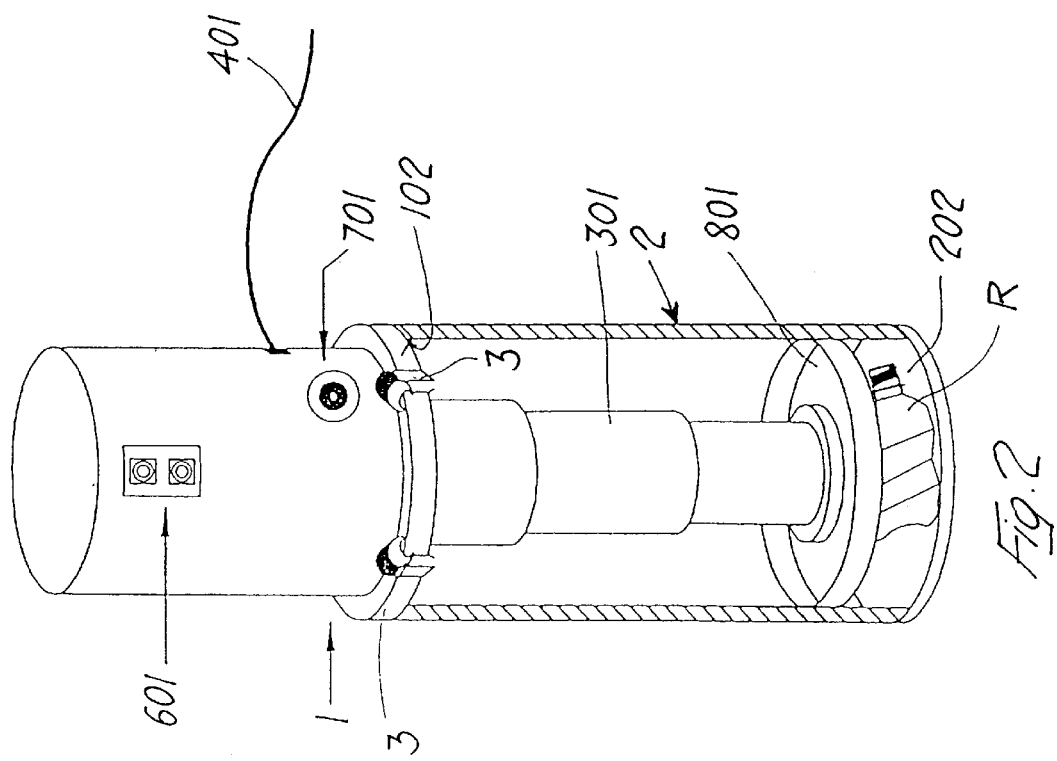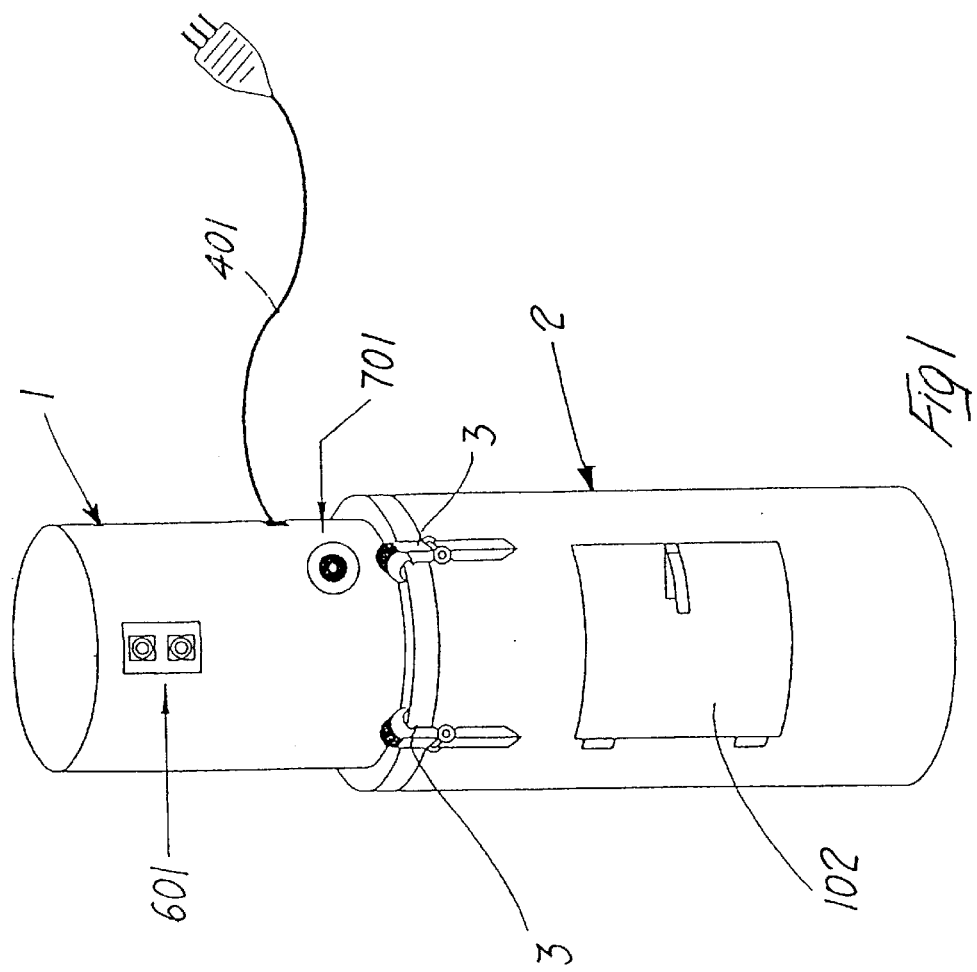

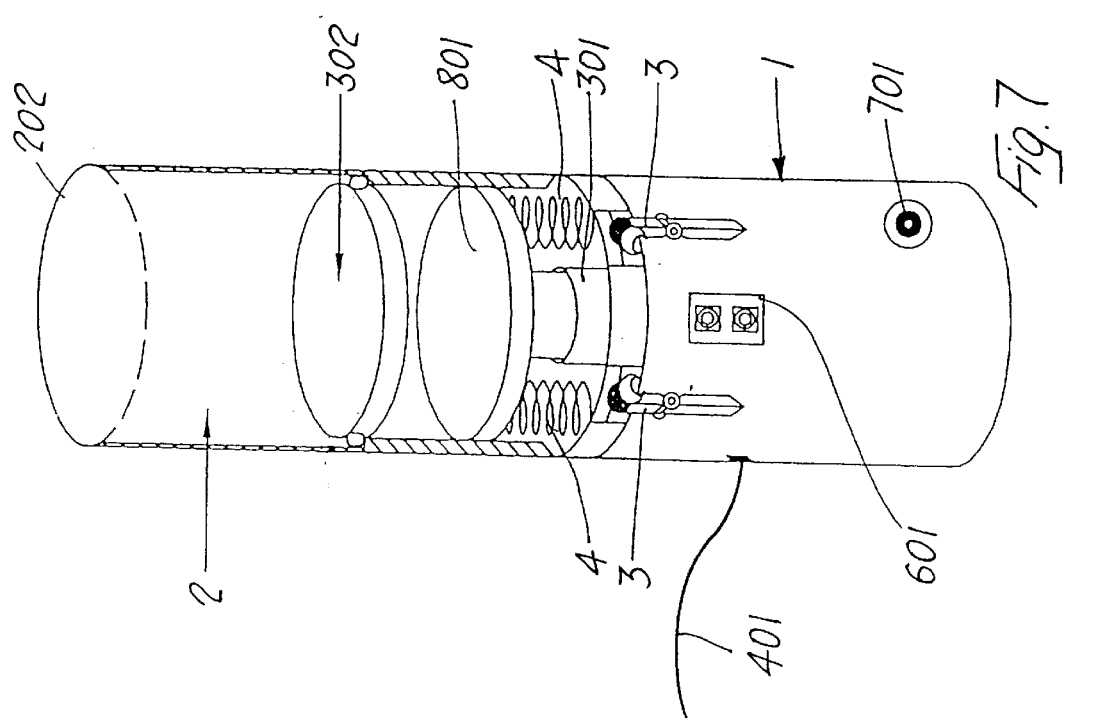
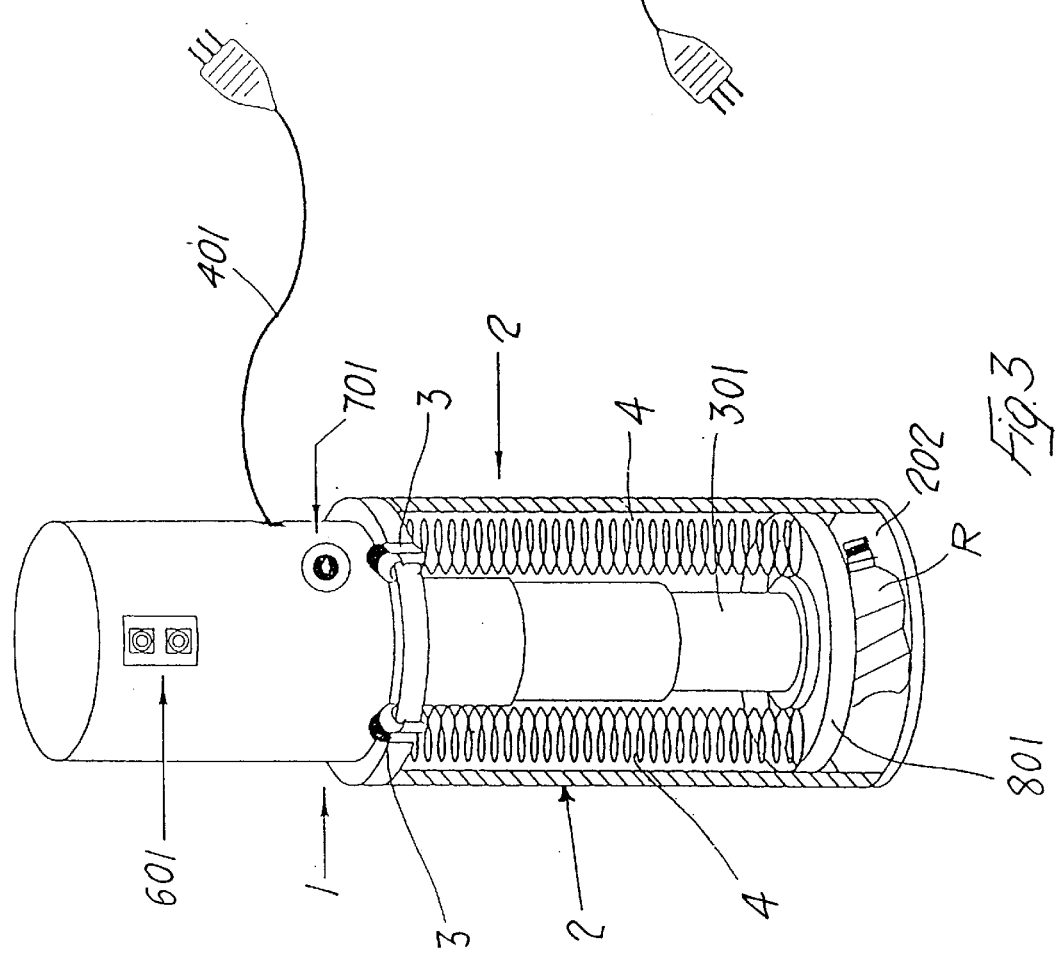

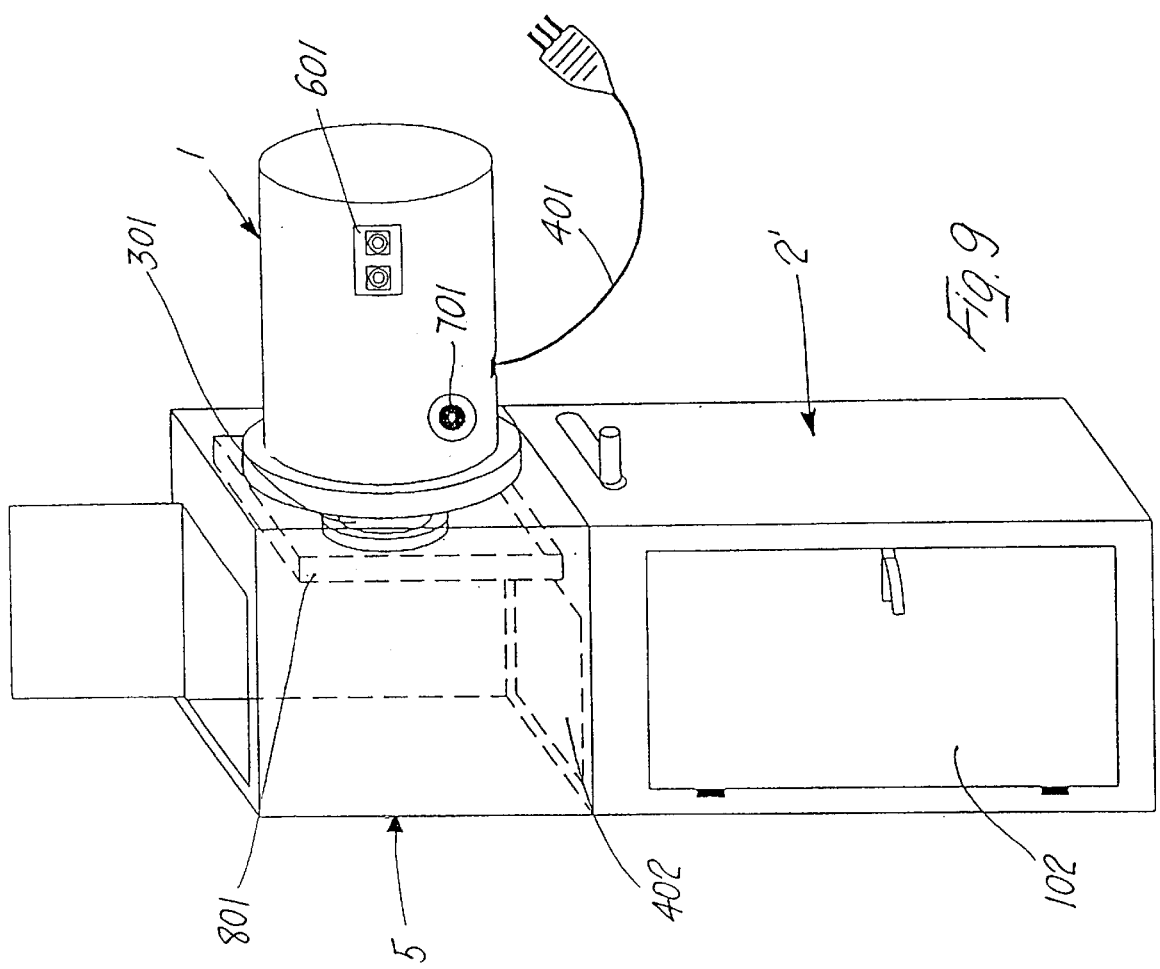
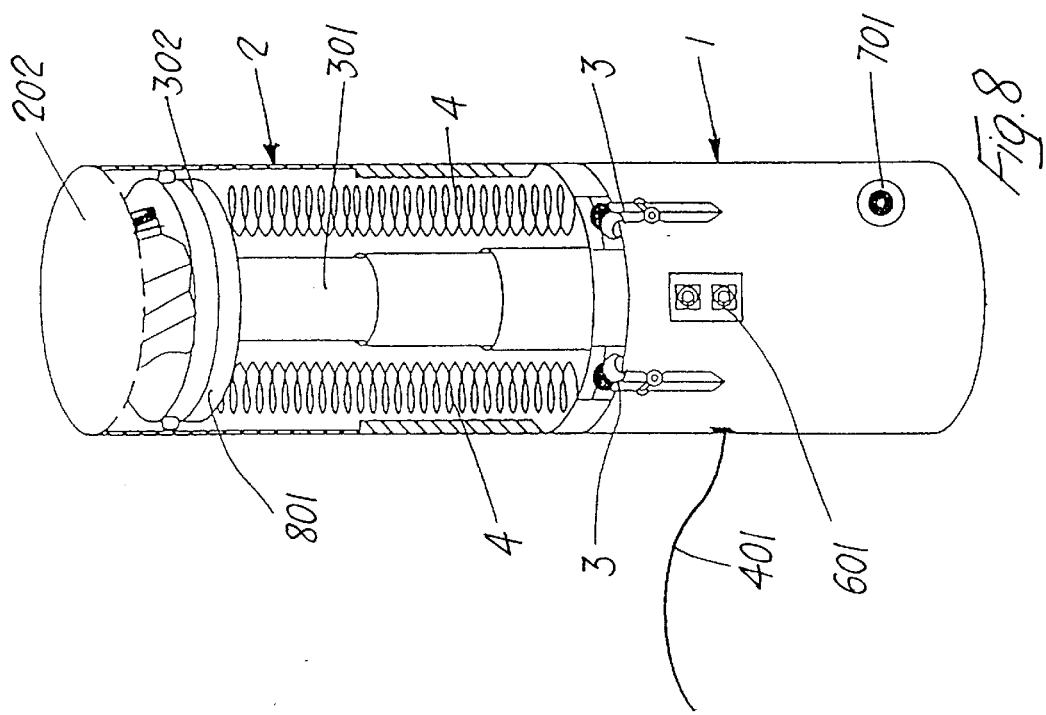

COMPACTING DEVICE FOR INORGANIC SOLID URBAN WASTE

BACKGROUND OF THE INVENTION

1. Field of the Invention

The invention relates to a compacting device for inorganic urban solid waste, particularly hollow bodies, or the like, to reduce the sizes and volumes of said hollow and bulky bodies, for example containers and packages in general, such as plastic bottles, carton and/or paste-board boxes, vessels, tanks, tins, pots, blisters, glass bottles, etc.

Hollow bodies go with the most varied articles since their origin, making up the selling package thereof. Once the associated product is used up, these packages are temporarily placed in the family dustbins to be subsequently discharged into the waste collecting containers, such as those provided in the streets, or the like. Among household rubbish, the package and inorganic-material hollow bodies account for up to 80% of the total volume of garbage, the remaining portion consisting of wastes which are generally referred to as humid and organic ones. This peculiarity of wastes consisting of hollow packages is regarded as one of the problematic factors in the waste collection and disposal, not to mention the fact that, due to the typology of materials used, packages also represent an environmental problem threatening the ecological balance of wide areas.

In this context, a correct and low-cost differentiated collection policy becomes increasingly difficult and economically unfeasible. The strong and substantial reduction of the inorganic urban solid waste volumes by practical, easy and economical systems would facilitate not only the heterogeneous waste collection but also the differentiated one. In fact, strong volume reduction allows for reducing by 20–30 times the present consumption of plastic bags for garbage packing, as well as the number of times a family must go to the collection sites. A proportional saving is also achieved of the number of special bins required for stockpiling, before collection by special trucks, hence a reduction of the transport trips from the municipal collection sites to the disposal dumps.

A more appropriate inorganic solid waste weight-volume-size ratio would make the differentiated collection reasonable, allowing the differentiation stage to be transposed upstream, at the household rubbish collection stage.

2. Summary of the Invention

The invention aims therefore at providing a device of the type mentioned at the beginning hereof, which allows for solid urban waste compacting at a stage prior to the collection one, i.e. under home conditions and keeping both purchase and running costs of the device low, as well as ensuring considerable application and operation flexibility thereof.

The invention achieves the above purposes through a compacting device of the type first described herein, exhibiting a construction and limited dimensions typical of usual household appliances for personal and private use.

The device according to the invention can exhibit a modular-type construction and its configuration may vary optionally from a minimum structure comprising at least a compacting unit which can be coupled with at least a collection and compaction container, to more and more complex structures. Said collection and compaction container has substantially limited dimensions corresponding to the dimensions of the usual home packages for wastes.

According to a further embodiment, the compacting unit includes a double-acting linear actuator, the rod of which carries a compression plate, said compression plate cooperating with an opposite striker surface formed on an opposite side of the collection and compaction container.

The compacting unit and the collection and compaction container can be removably assembled to one another, it being possible to provide a plurality of further means and auxiliary devices to be applied or not.

According to a first improvement, means for collection and compaction directly inside a package, such as a bag or the like, can be associated with the collection and compaction container.

In addition, there can be provided means to automatically close the packages in which the compacted wastes are collected, means for the trituration and/or preventive volume reduction of the waste hollow bodies, in combination with one another.

According to a further arrangement variation, at least the compacting unit is mounted alternately movable by translation and/or rotation from one another of a plurality of collection and compaction containers, each intended for collecting and compacting a predetermined type of waste, thereby easily enabling differentiated waste collection and treatment, already at home.

The invention relates to further improvements which are stated in the dependent claims.

BRIEF DESCRIPTION OF THE DRAWINGS

The characteristics and advantages of the invention will more clearly appear from the following description of some preferred embodiments, which are elucidated by way of non-limiting examples with reference to the enclosed drawings, in which:

FIGS. 1 and 2 show a first embodiment of the device according to the invention.

FIG. 3 shows an arrangement variation of the device according to FIGS. 1 and 2.

FIGS. 7 and 8 show a further arrangement variation of the device according to the preceding figures, in which the compacting unit operates in the opposite direction relative to the preceding figures.

FIG. 9 show an arrangement variation of the device according to the invention, in which compaction takes place following a horizontal movement.

DESCRIPTION OF THE PREFERRED EMBODIMENTS

With reference to FIGS. 1 and 2, in its simplest embodiment, a compacting device according to the invention is made up of a compacting unit 1 and a collection and compaction container 2 for hollow bodies, shown in the form of plastic bottles and marked by R.

Figure 4:
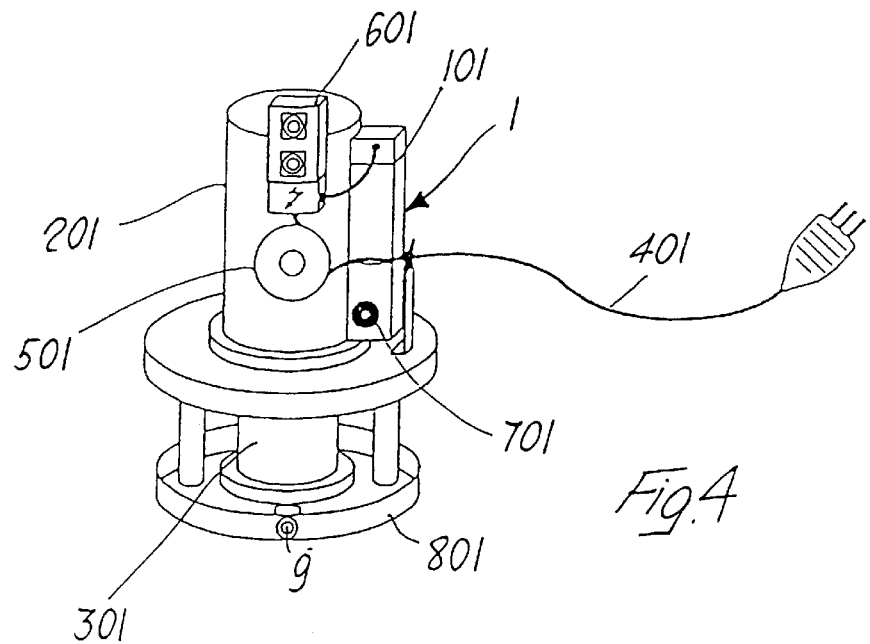
FIGS. 4 to 6 show the compacting unit of the device according to the invention.
Figure 5:
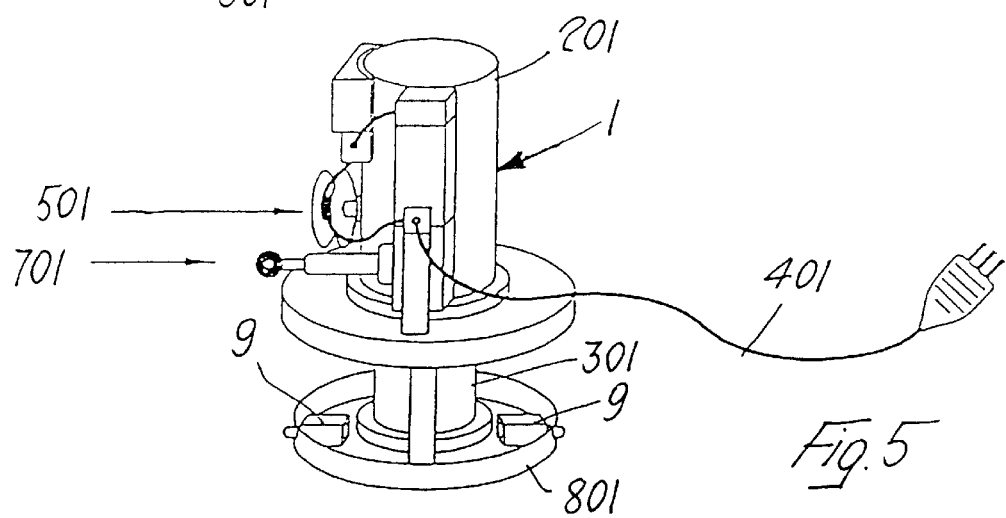
Figure 6:
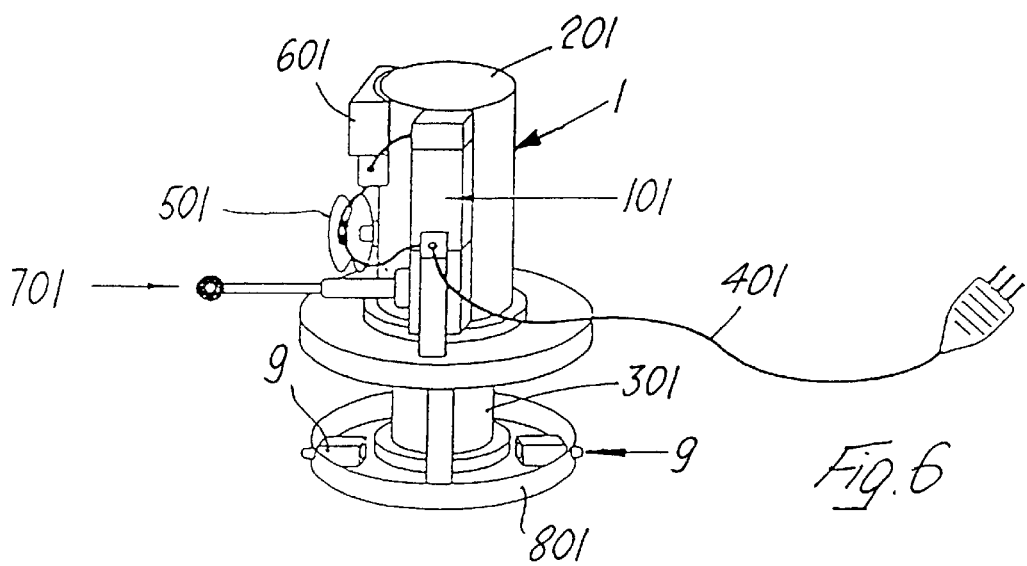
Figure 10:
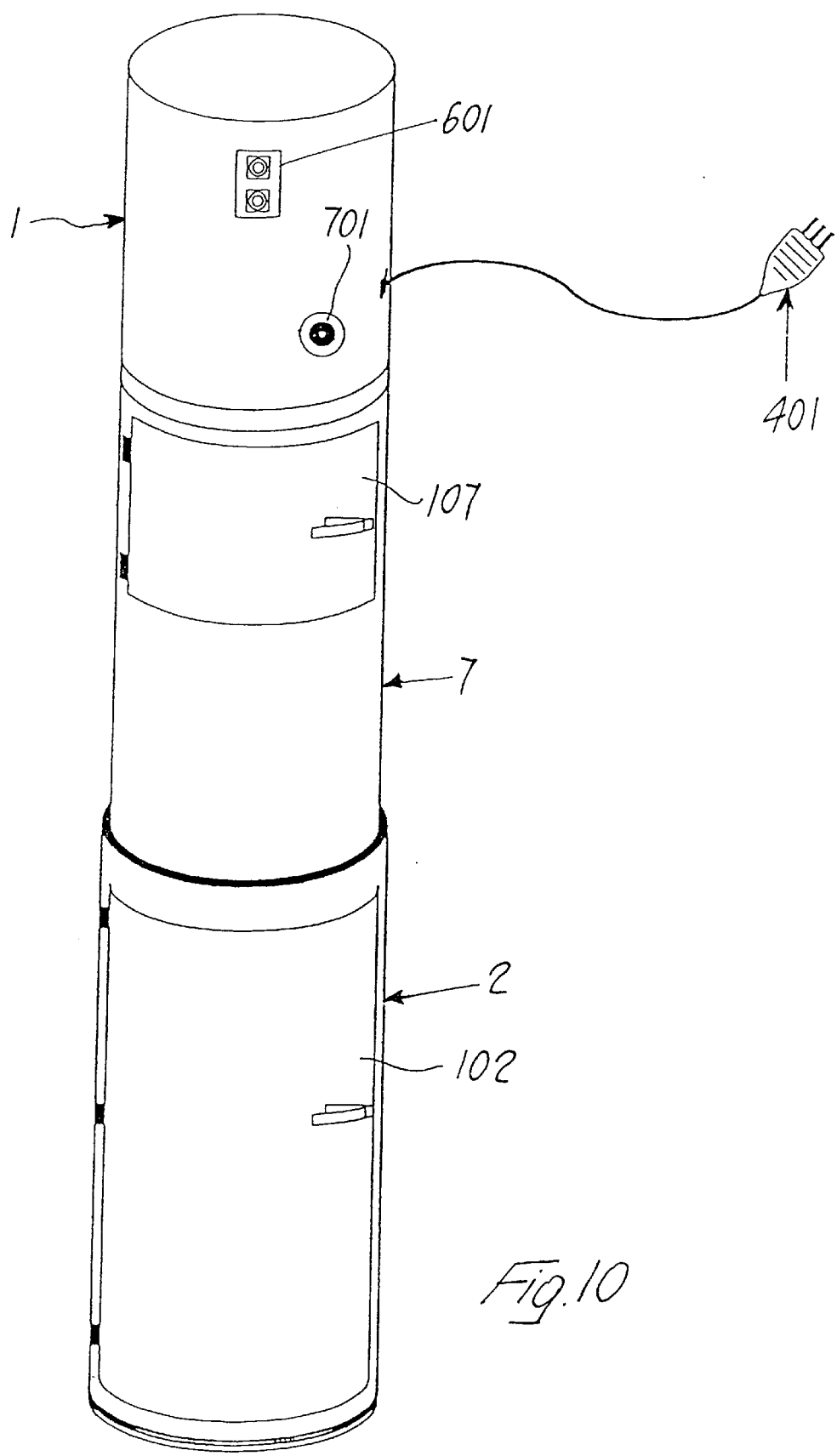
FIGS. 10 to 16 show a second embodiment of the device according to the invention, in which compaction is performed inside packing means of the compacted wastes.
Figure 11:
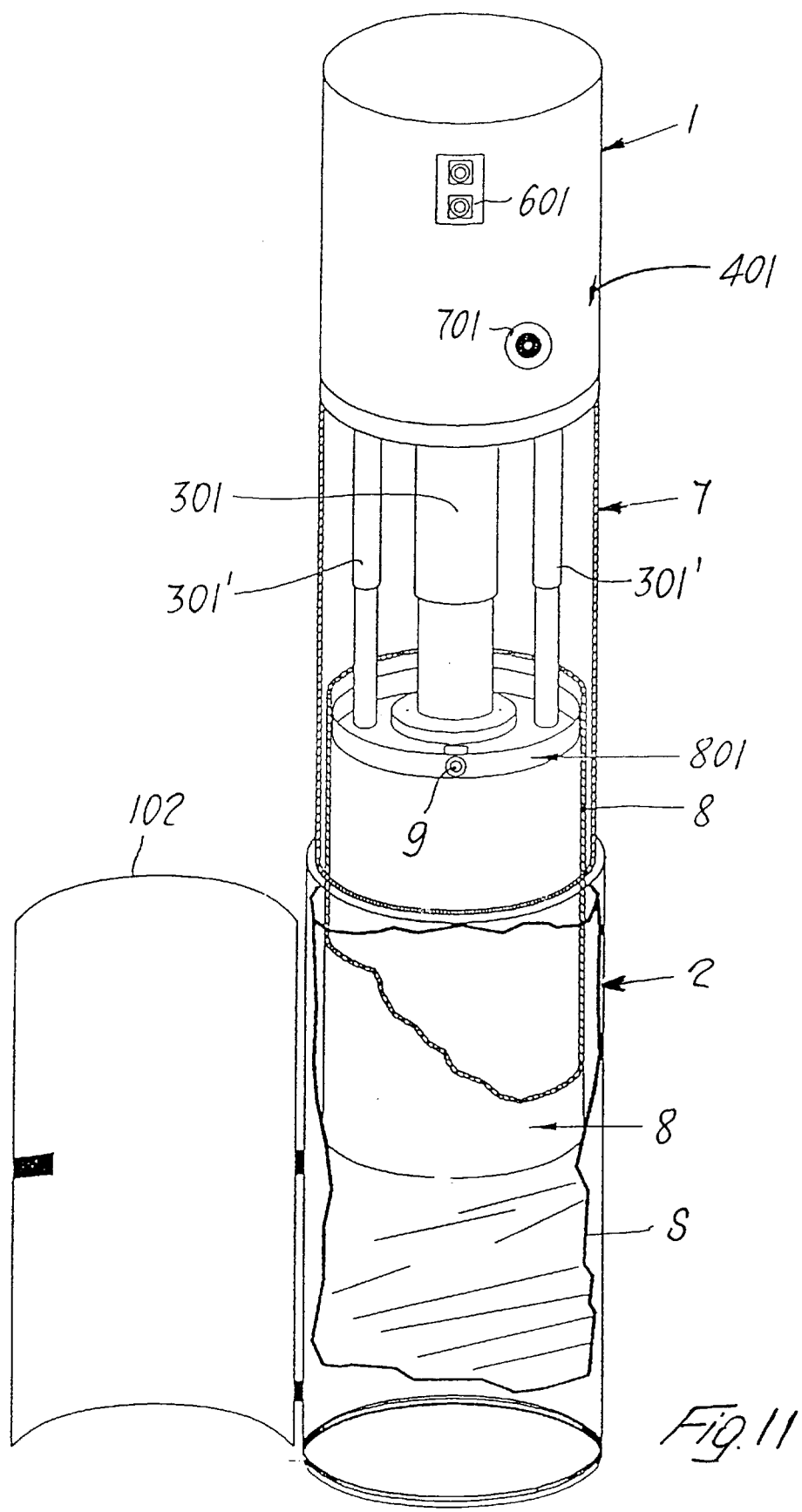
Figure 12:
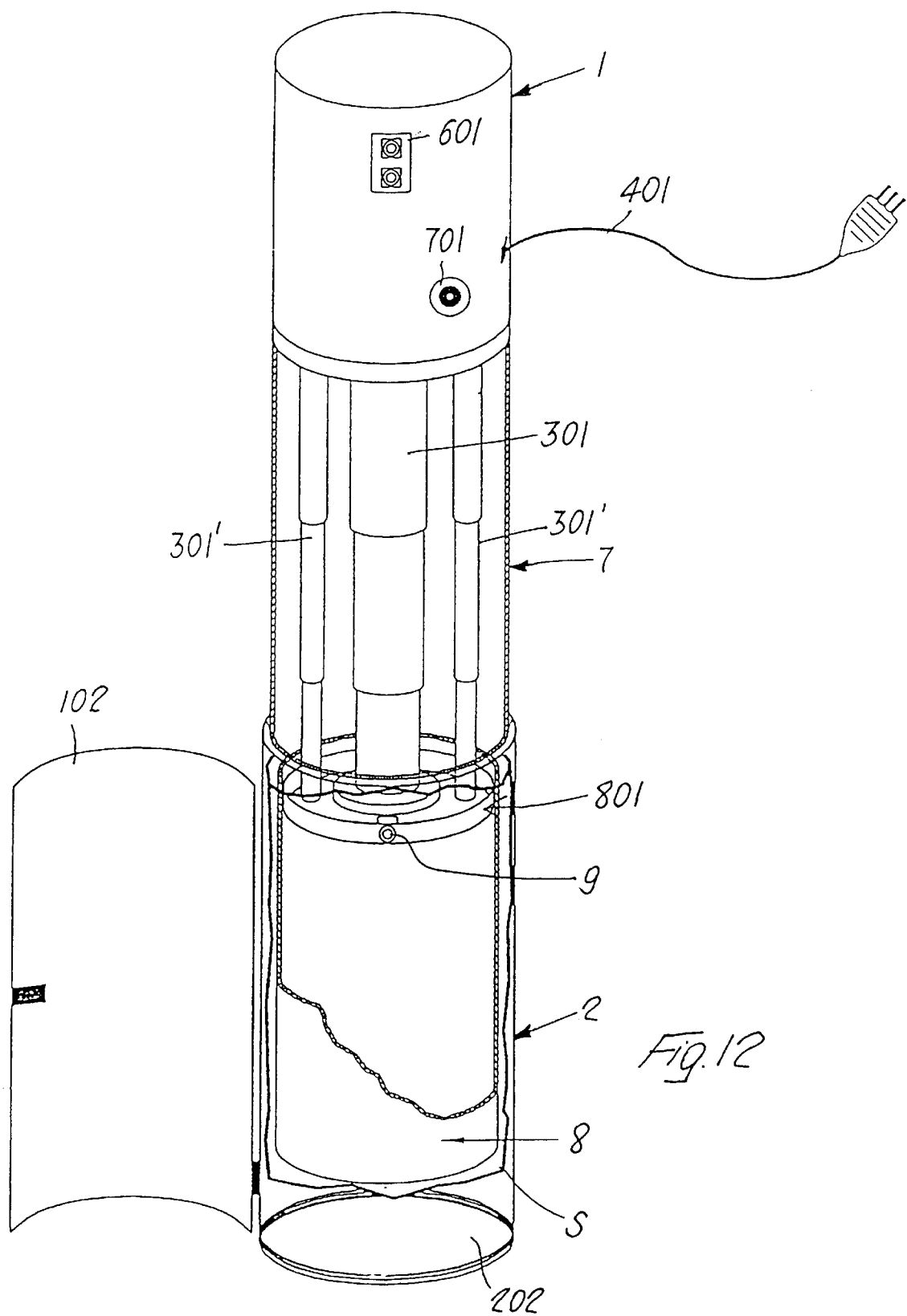
Figure 13:
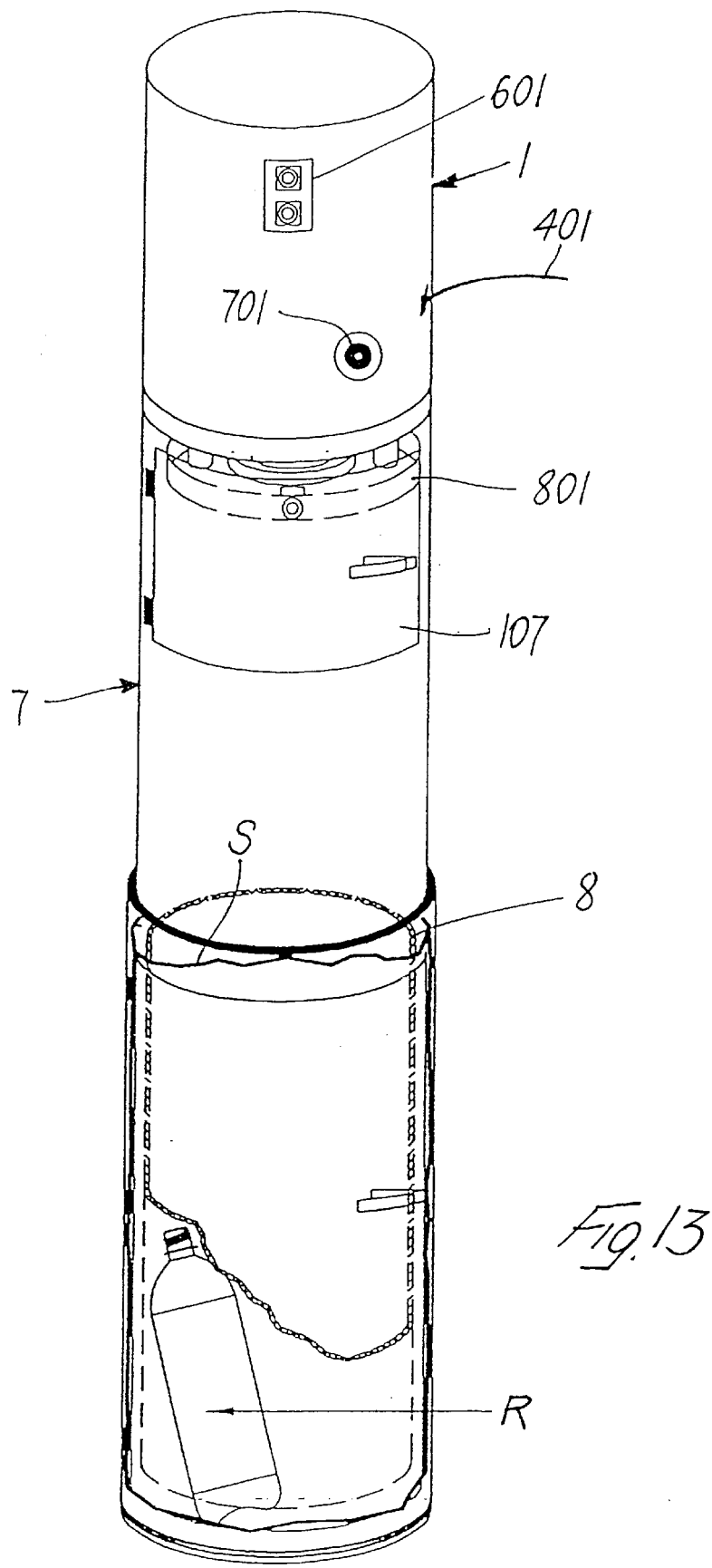

The compacting unit 1 (FIGS. 4 to 6) consists of a power unit 101 driving a linear actuator 201, for example of the type including a telescopically extensible rod 301. The electric-type power unit 101 is fed by a power supply cable 401 mounted on a special automatic take-up spool (known in itself) 501 and it is operable by means of a control switch 601. Moreover, according to an improvement, the linear actuator 201 may also be manually operable, e.g. by means of a recessed control lever 701. The driving motor 101 is preferably of electric type and fed by direct current, so that it can be battery fed.

The collection container 2 has a side filling door 102 and can be removably attached to the compacting unit 1, for example by means of snap engageable hooks marked by 3.

The collection and compaction container 2 shows an open coupling side transversal to the telescopic rod 301, the longitudinal axis of the same container being substantially parallel to that of said telescopic rod 301. On the side opposite to the open one, the collection and compaction container 2 is closed by a stationary striker wall 202 also transversal to the telescopic rod 301. The telescopic rod 301 carries a compression plate 801 which is therefore parallel to the striker wall 202 of the compaction container 2, the hollow bodies R collected in the collection and compaction container 2 being pressed hence reduced in volume between said plate 801 and said wall 202.

Advantageously, the collection and compaction container shows a cylindrical symmetry form about the axis of the rod 301 of the compacting unit 1, the compression plate 801 consisting of a disc which is coaxial to the rod 301 and slightly smaller in diameter than the inside diameter of the cylindrical collection and compaction container 2. The compacting unit 1 is mounted at a circular end side of the container 2, whereas the opposite circular wall is the striker wall 202.

The linear actuator 201 of the compacting unit 1 can be of the type which can be operated both in extension and in retraction direction of the telescopic rod 301. Nevertheless, as shown in the alternative arrangement in FIG. 3, the retraction or return movement of the rod 301 can be also achieved thanks to return elastic means 4 which may be connected on one side to the compression plate 801 and of the other side to the stationary body of the actuatore 201 itself.

In the devices according to FIGS. 1 to 3, the collection and compaction container 2 is located in upright position under the compacting unit 1, the actuator acting vertically downward. This arrangement, yet, is not limitative. This results from FIGS. 7 and 8, in which a device similar to that of FIGS. 1 to 3 provides that the compacting unit 1 is the device supporting surface, the collection and compaction container 2 being arranged over the compacting unit 1 and the actuator being vertically operated upward, compression-wise.

According to further improvement, to avoid that the compression disc 801 forms directly the bottom side of the collection and compaction container 2 on which the waste material R is accumulated, on the side of said container 2 facing the compression disc 801 a bottom plate 302 is provided, which is axially slidably mounted inside the collection and compaction container 2 and on which the compression disc 801, in turn, acts.

In the alternative arrangement according to FIG. 9, instead, the compacting unit 1 is mounted transversely to the vertical extension of the collection container, as far as the extension direction of the telescopic rod 301 is concerned.

In this case, the collection container 2' is located below a compacting chamber 5 in which wastes R are fed. Wastes R are compacted thanks to a compression in a horizontal direction between a vertical side wall of the compacting chamber 5 and a parallel and substantially complementary compression plate 801 mounted on the rod 301. Once compacted, wastes R are accumulated in the collection container 2'. Compacted wastes R are transferred by gravity from the compacting chamber 5 to the collection container 2' through an openable door 402 provided in the partition between said compacting chamber 5 and said collection container 2'.

In all these examples, wastes R are compacted directly in a special chamber or freely collected in a defined container. Therefore, after compaction they must be collected and packed in turn into special containers, such as plastic bags, or the like.

FIGS. 10 to 16 show a first embodiment of a device according to the invention, which allows wastes R to be collected and compacted directly inside the package thereof, for example inside a waste bag S.

In this example, between the collection and compaction container 2 and the overlying compacting unit an intermediate housing chamber 7 is provided for a cylindrical, tubolar jacket member 8 which can be coaxially fitted into the collection and compaction container 2 or completely extracted from same.

The intermediate chamber 7 has a cylindrical shape, a diameter substantially corresponding to that of the collection and compaction container 2 and certainly slightly larger than the outside diameter of the tubular jacket 8, whereas the axial length of the intermediate chamber corresponds to that of the jacket member 8 or the collection and compaction container 2.

Through door 102, a packing bag S for compacted wastes is introduced into the collection and compaction container 2. Bag S is housed in open and spread out condition, so that the tubular jacket 8 can be fitted from above into the bag S, thereby forming a stiff wall interposed between the inside of the bag S and the side peripheral wall thereof. At the end of such operation, see FIG. 13, the tubular jacket member 8 is completely housed in the bag S which is located in the collection and compaction chamber 2. Wastes R can be then introduced into the bag S, in the inside space of the tubular jacket member 8, from above, namely from a door 107 of the intermediate chamber 7.

Figure 14:
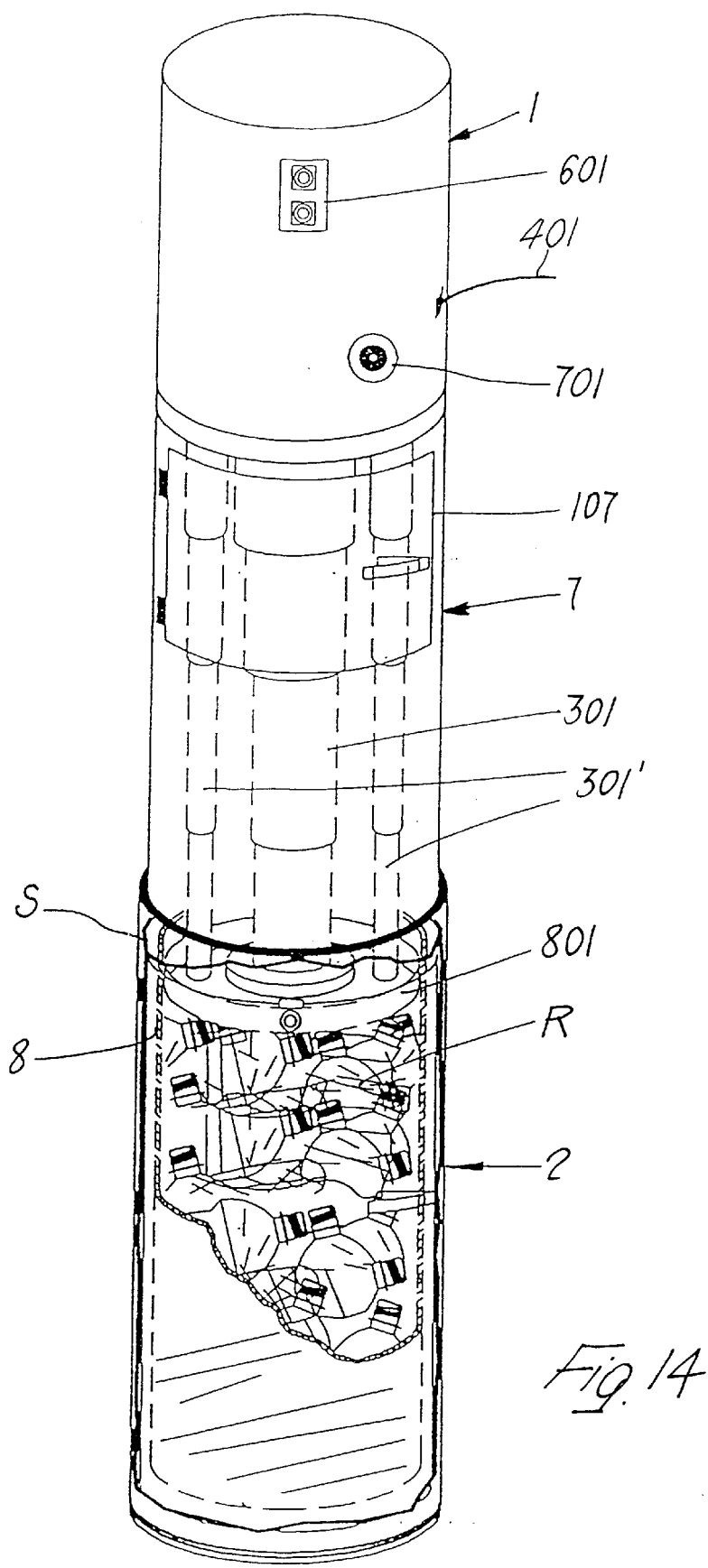

With reference to FIG. 14, once the bag S has reached a preset filling level, the compression disc 801 is pushed from above against the wastes R inside the jacket 8. In this case, therefore, the compaction of wastes R does not damage the bag S but it occurs inside the stiff tubular jacket 8.

At the end of compaction, the compression disk 801 is withdrawn and the the jacket 8 is taken out of the bag S which can be closed and brought to the pre-established collection site.

According to the embodiment in FIGS. 10 to 16, the tubular jacket member 8 is pushed between the two positions by means of the same compression disc 801, the latter being provided in at least two diametrally opposed positions with removable engagement radial means 9, preferably of the release type, such as radial teeth, or the like, with cogging notches in the walls of the jacket member 8.

According to a further characteristic, the compression disc 801 is formed by at least two mutually concentric portions, i.e. an external annular portion and a complementary central disk, each of which portions is individually controllable by associated linear actuators, for example by telescopically extensible driving rods 301, 301'.

Figure 15:
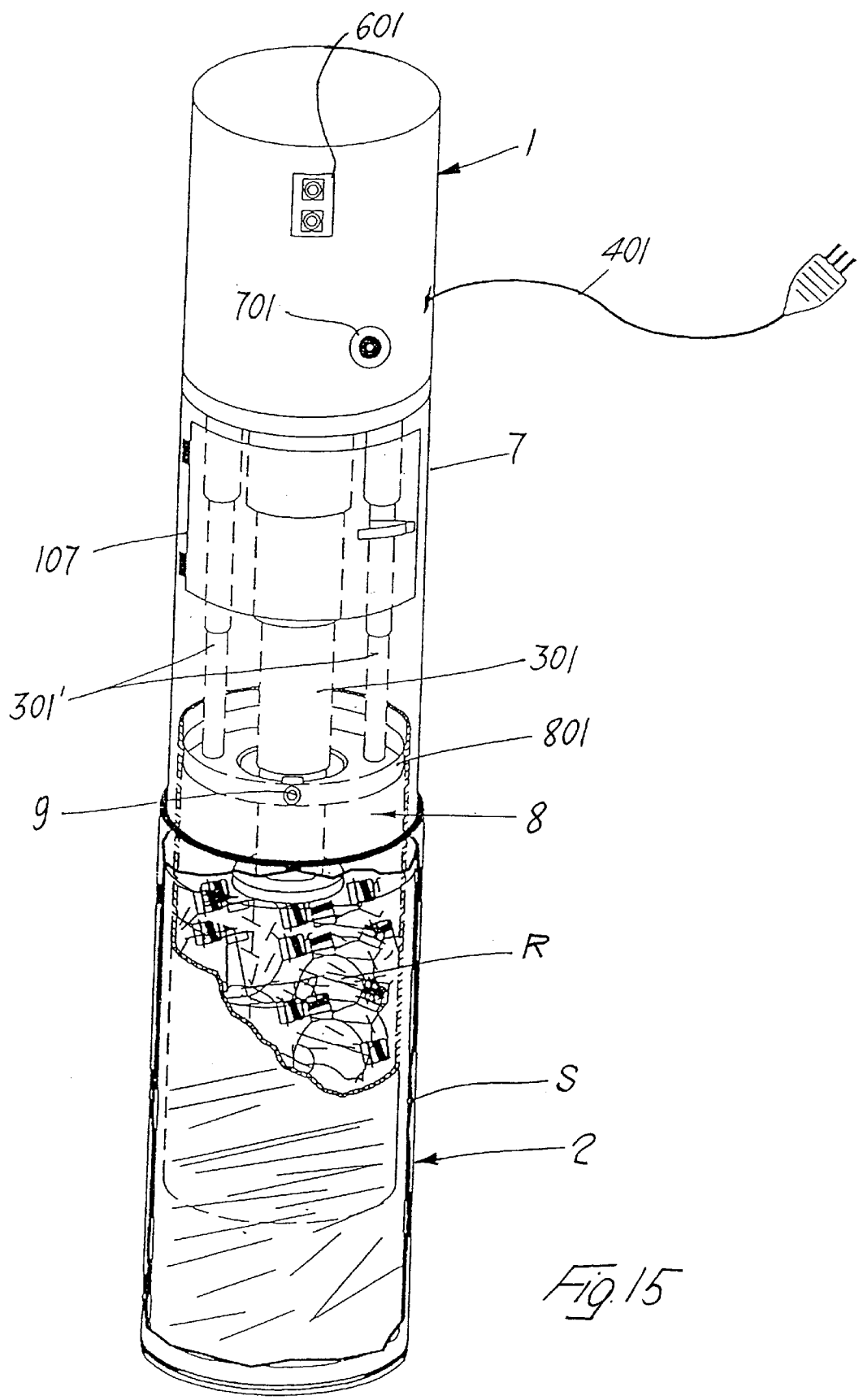
Figure 16:
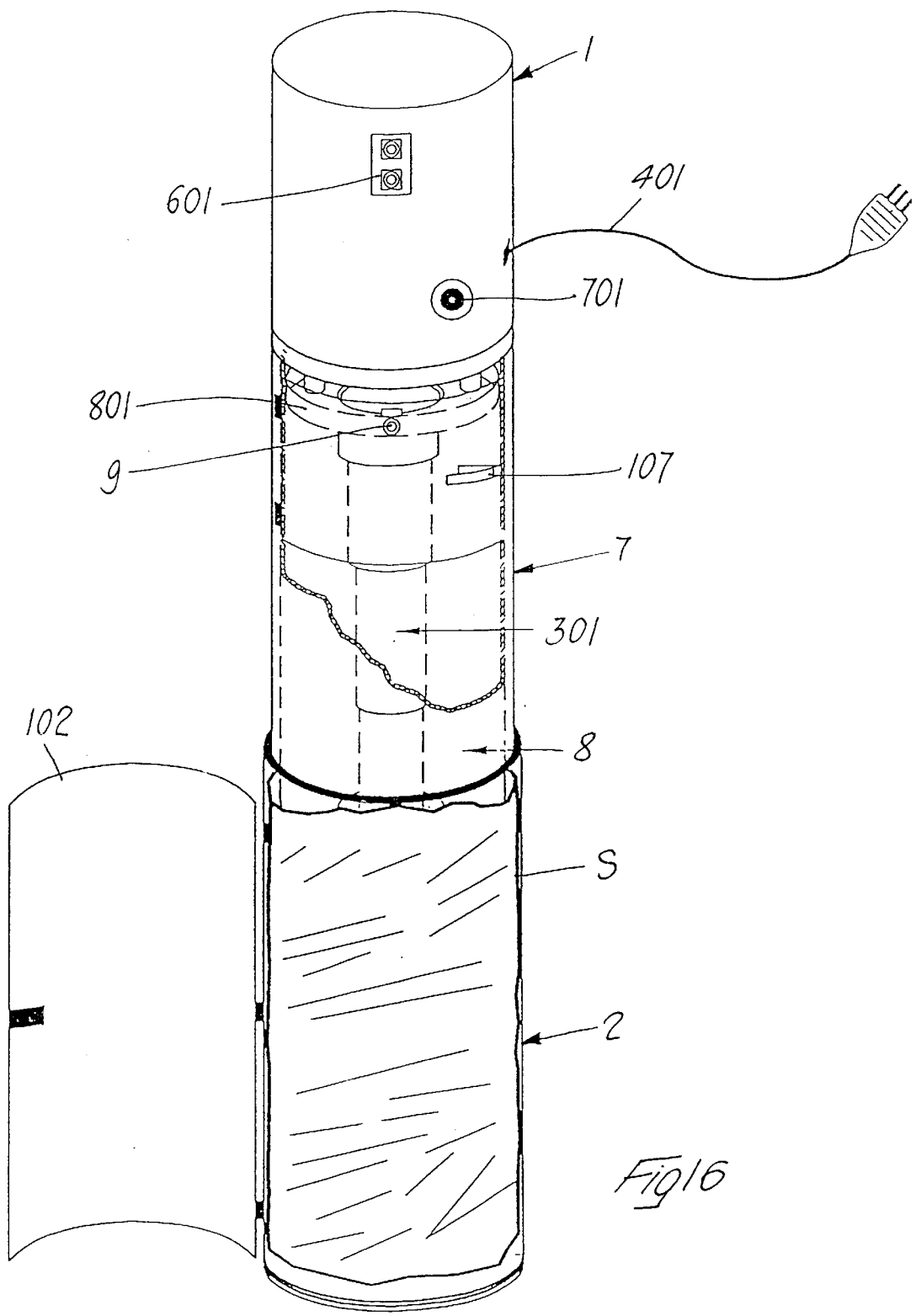

Both for the lowering of the tubular jacket member 8 and for the compression of the wastes R, rods 301, 301' associated to the annular portion ad to the central disc are operated together, so as to obtain a combined displacement of said two portions making up the compression disc 801. Upon the extraction of the jacket member 8 from the bag S in which wastes have been compacted, it is advantageous to provide for the axial upward withdrawal of only the annular portion which carries the jacket member 8, whereas the central portion of the compression disc 801 remains in the waste R compression position, avoiding that the jacket member 8 can drag with it the whole bag S with the compacted wastes R (FIGS. 15, 16).

Figure 17:
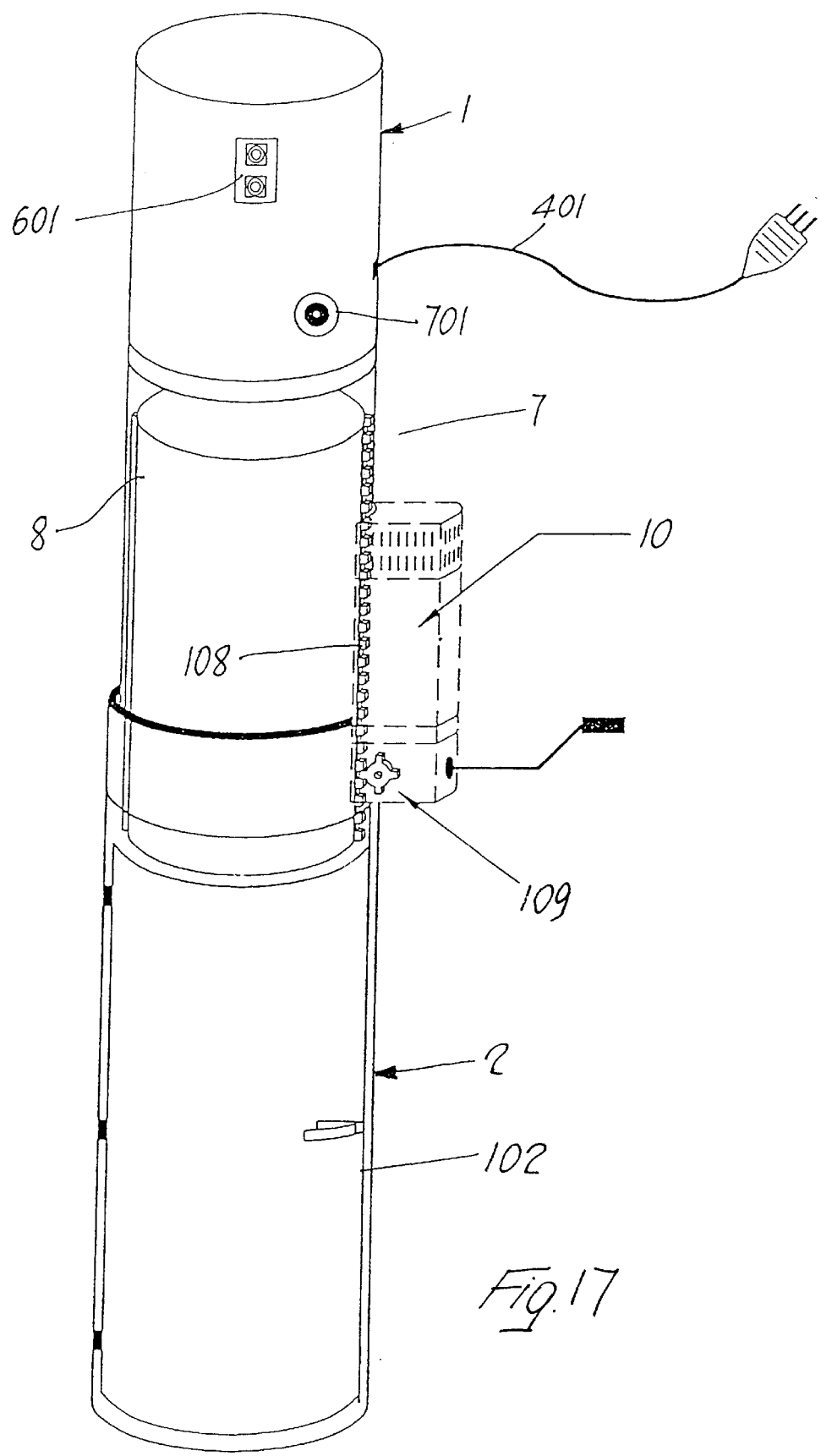
FIG. 17 is a first arrangement variation of the device according FIGS. 10 to 16.
Figure 18:
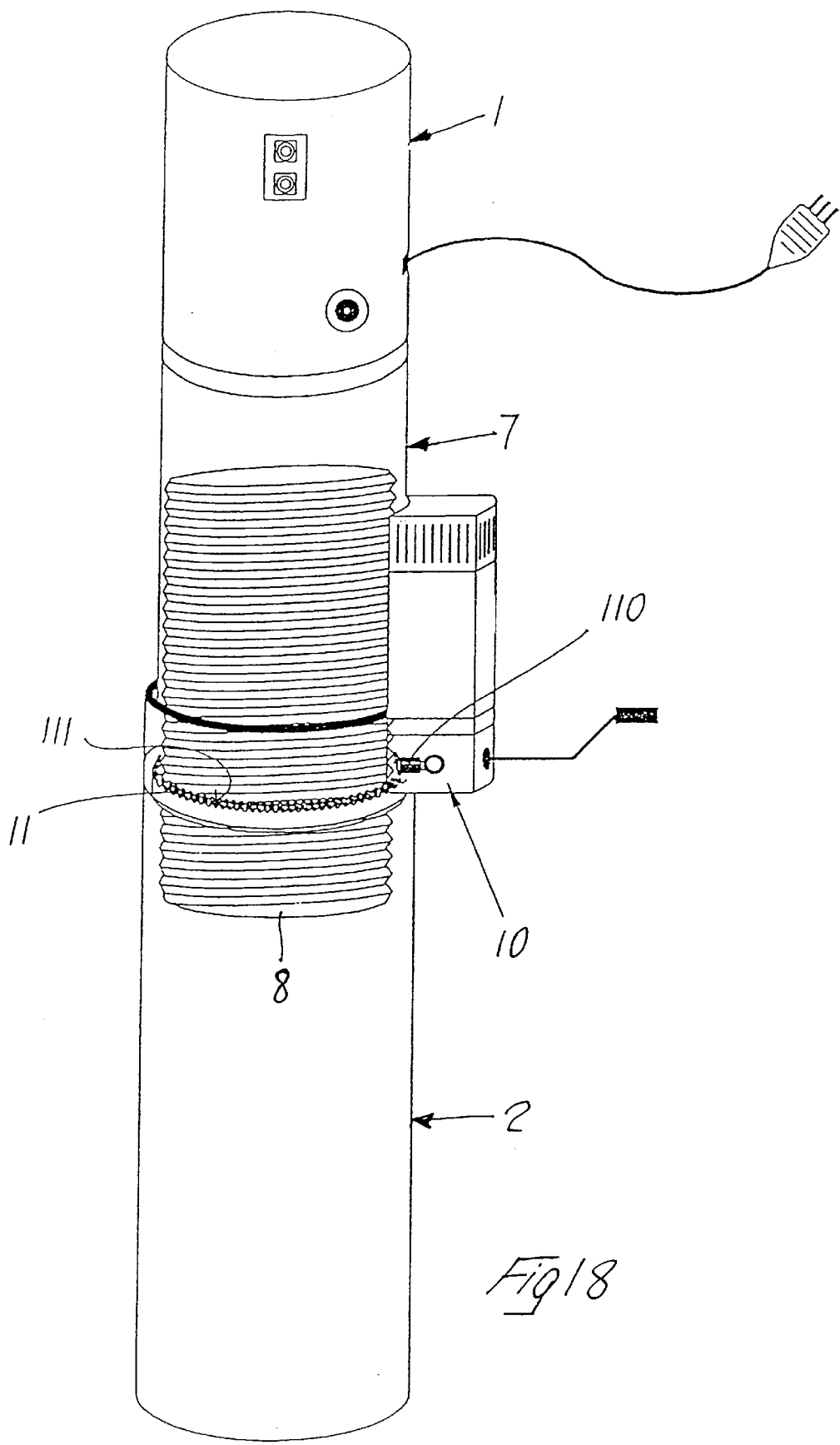
FIG. 18 is a second arrangement variation of the device according FIGS. 10 to 16.

With reference to FIGS. 17 and 18 it is also possible to provide different lifting and lowering means for the tubular jacket member 8, which for example in FIG. 17 consist of a rack drive. A rack 108 is secured to the jacket member 8, vertically oriented and parallel to the axis thereof, a pinion 9 which is rotatably operable by means of a handle mechanism 10 being engaged with said rack.

In FIG. 18, the tubular jacket member 8 externally shows a thread for engagement with the inside thread of an annular element 11 of a nut screw which on its head peripheral rim shows a toothing 111 with which a pinion 110 of the handle driving mechanism 10 is engaged.

Figure 21:
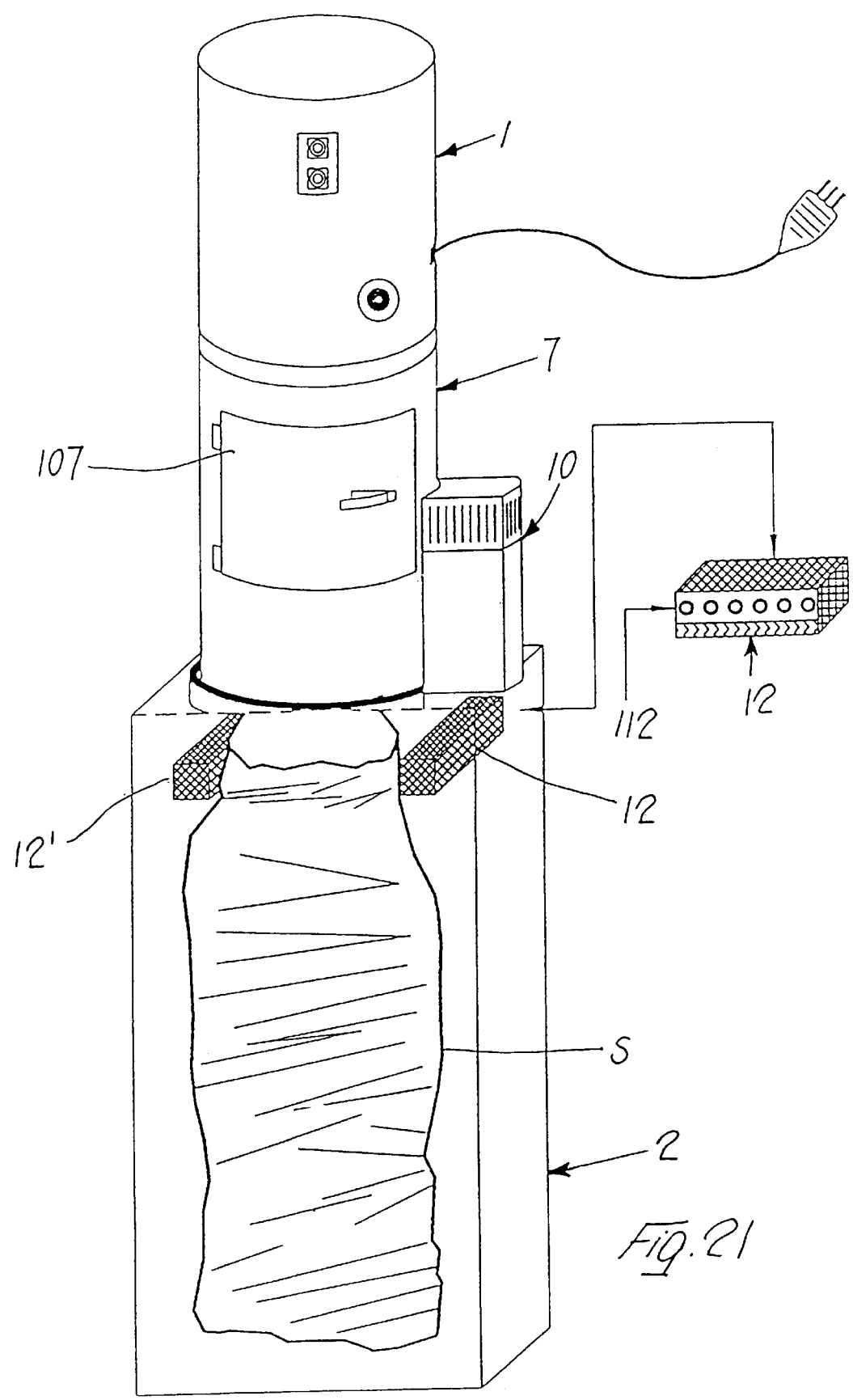
FIGS. 21 and 22 show an embodiment of the device according to FIGS. 10 to 16, in which automatic package closing means are provided.
Figure 22:
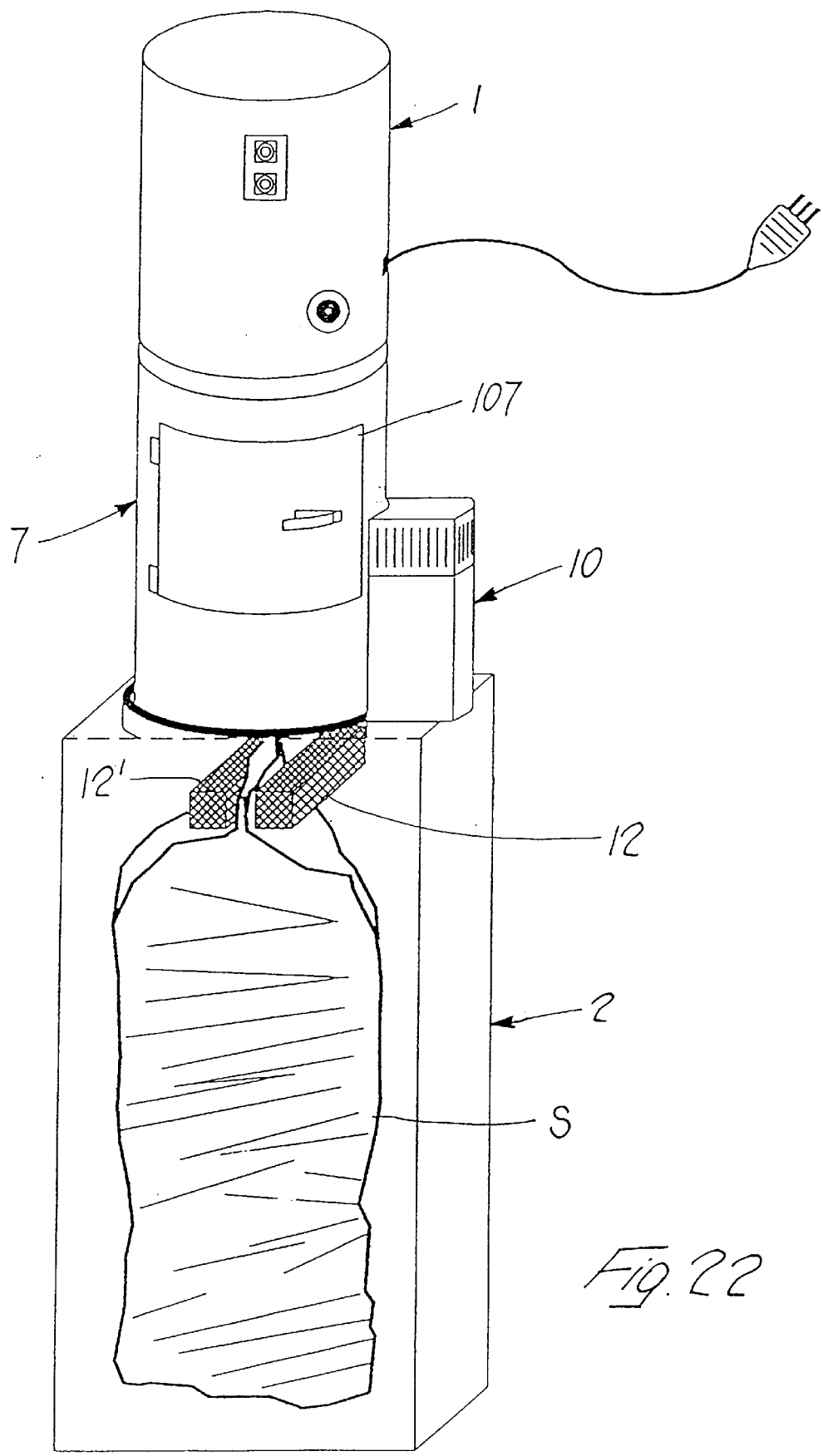

Moreover, means to automatically close bags S can be associated to the above device. These means can be of any type. In the example according to FIGS. 21 and 22 in the upper region of the collection and compaction chamber 2, on the side of the feeding opening of the bag S two jaws 12, 12' are provided facing each other for closure by welding of the bag S itself. The two jaws 12, 12' can be heated, for example, by means of heating elements, and can be moved against each other clamping between them with a preset force the free upper edges of the opening of the bag S. Advantageously, the two welding jaws 12, 12' are also provided with sucking nozzles 112 which permit to achieve better grasping hence better positioning of the opening edges of the bag S.

Figure 23:
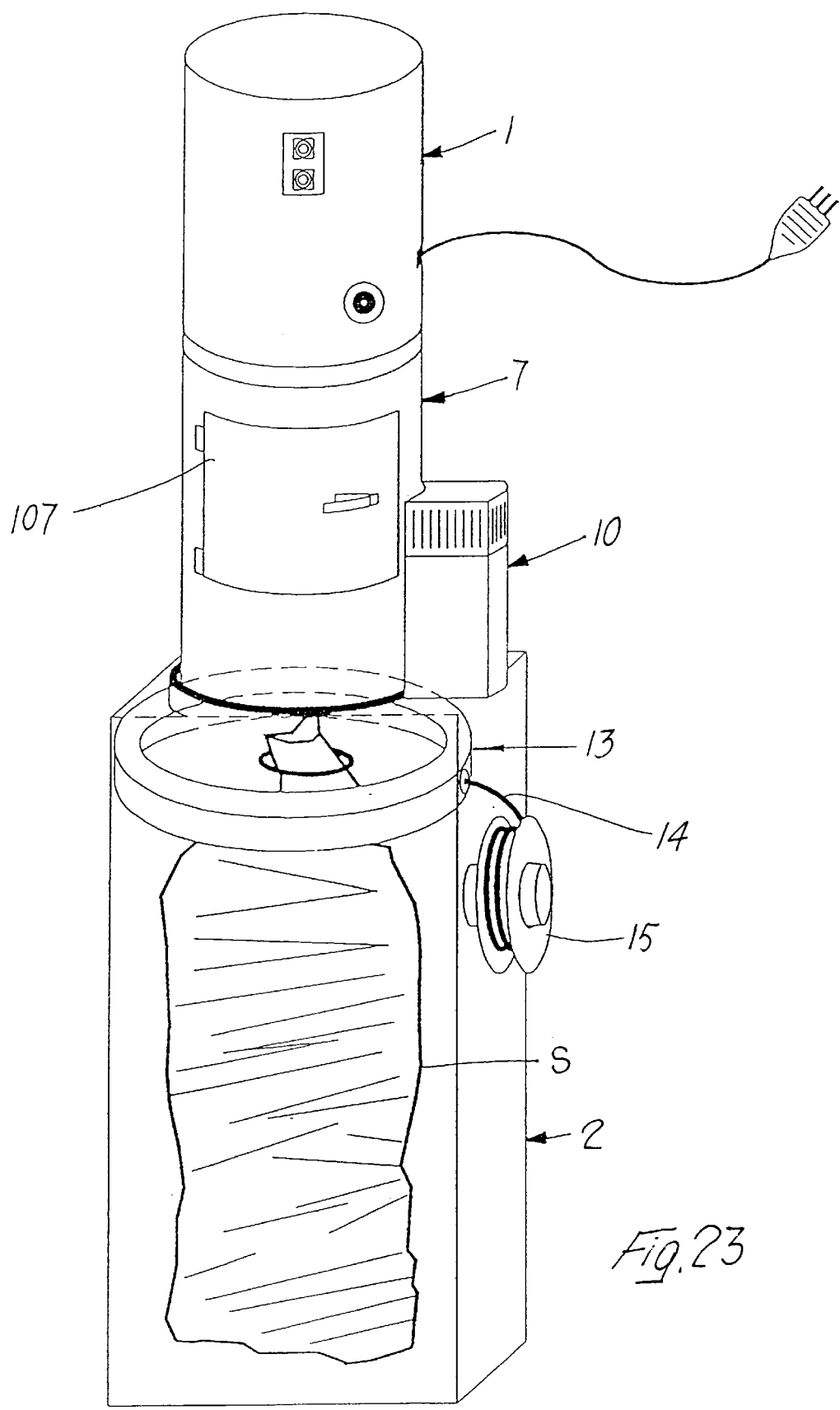
FIG. 23 shows an arrangement variation of the device according to FIGS. 21 and 22.

As an alternative to this automatic closure device, FIG. 23 shows a thread-type automatic closing device consisting of a thread-holding and -throwing ring 13, in which a binding thread 14 unwound from a spool or reel 15 is substantially radially passed from the outside to the inside. The rotation of the thread-holding ring 13 around the opening of the bag S causes the thread 14 to be wound around it, hence the closure of the bag S itself.

The bag S closing means can also be of the pliers-like type and they can consist not only of automatic systems but also of manual systems.

Figure 19:
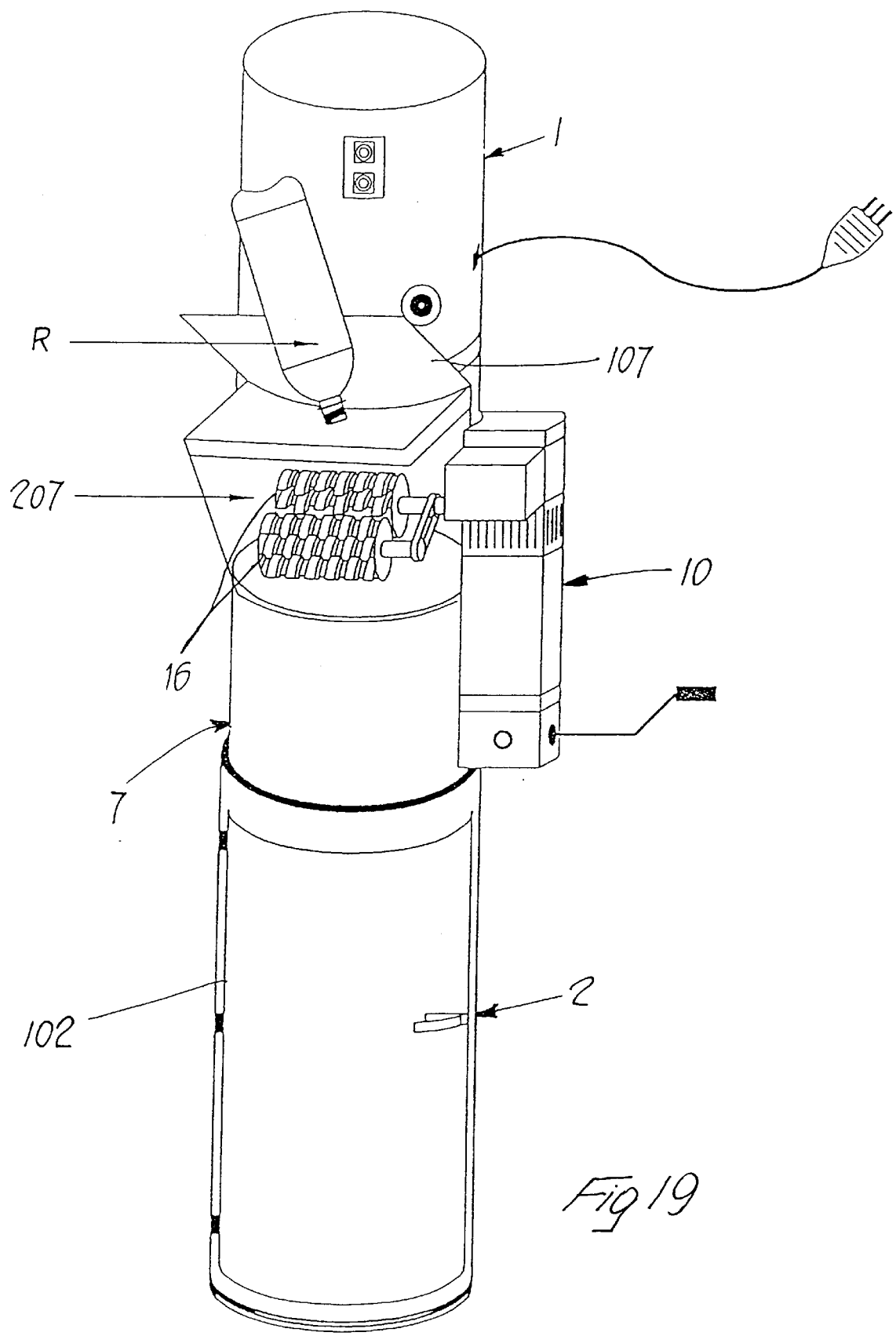
FIG. 19 shows an embodiment of the device according to the invention, in which means are provided to triturate wastes to be compacted.
Figure 20:
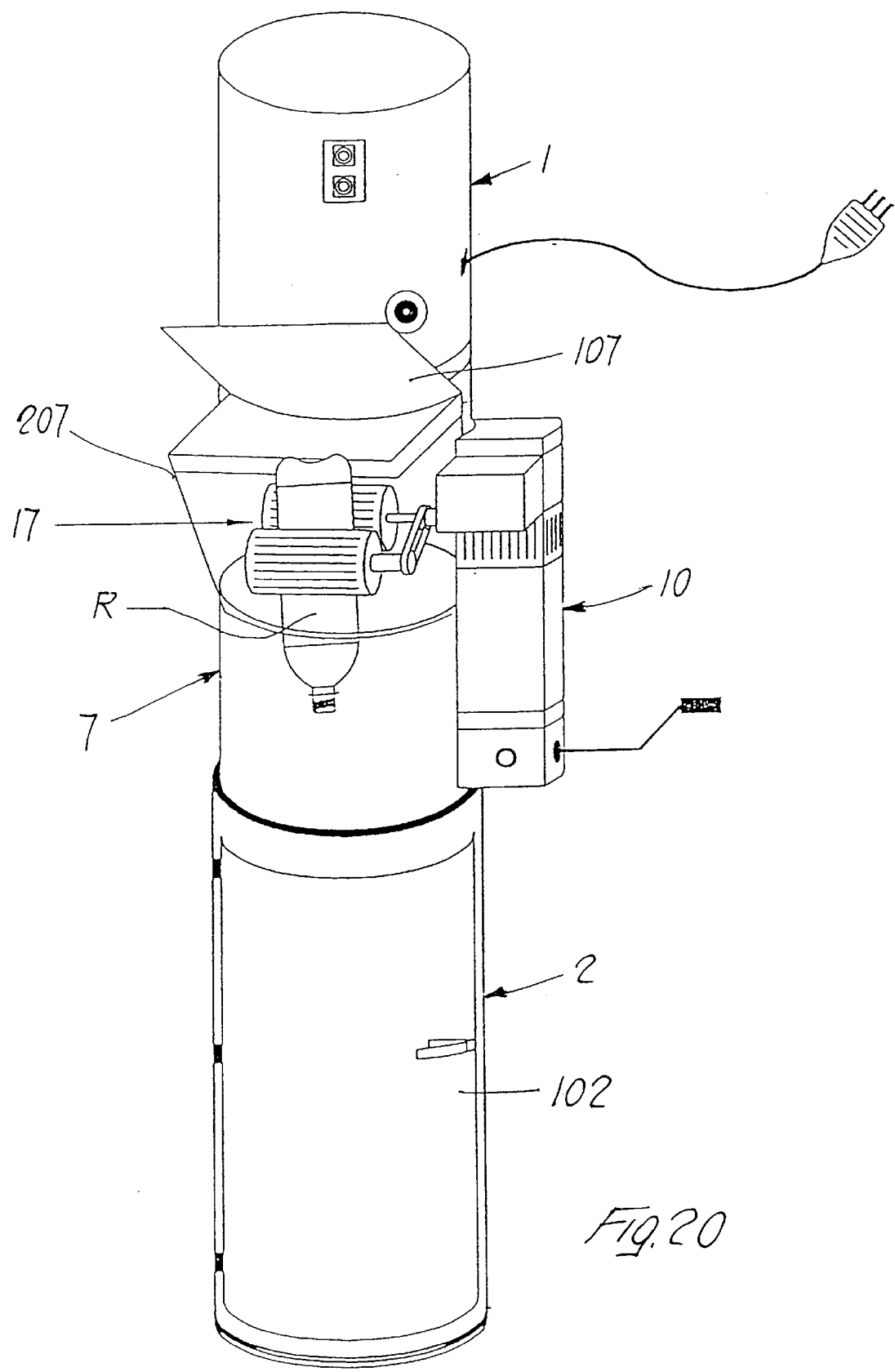
FIG. 20 shows a further embodiment of the device according to the invention in which pre-compacting means are provided.

According to a further improvement of the device according to the previous figures, in the region of the feeding door 107 of the intermediate chamber 7 it is possible to provide pretreatment means for compacting or reducing the volume of hollow wastes R (FIGS. 19 and 20).

In the region of door 107, the waste feeding opening is formed like a side feeding hopper 207. Inside said hopper it is possible to provide waste R triturating means. This is illustrated by the sets of rotating knives 16 which are driven by a handle mechanism 10. Operation can be motor driven too, in particular by means of an electric motor, or the like.

In the example of FIG. 20, instead of rotating knives, precompression rollers for waste hollow bodies R globally under reference numeral 17 are provided.

Figure 24:
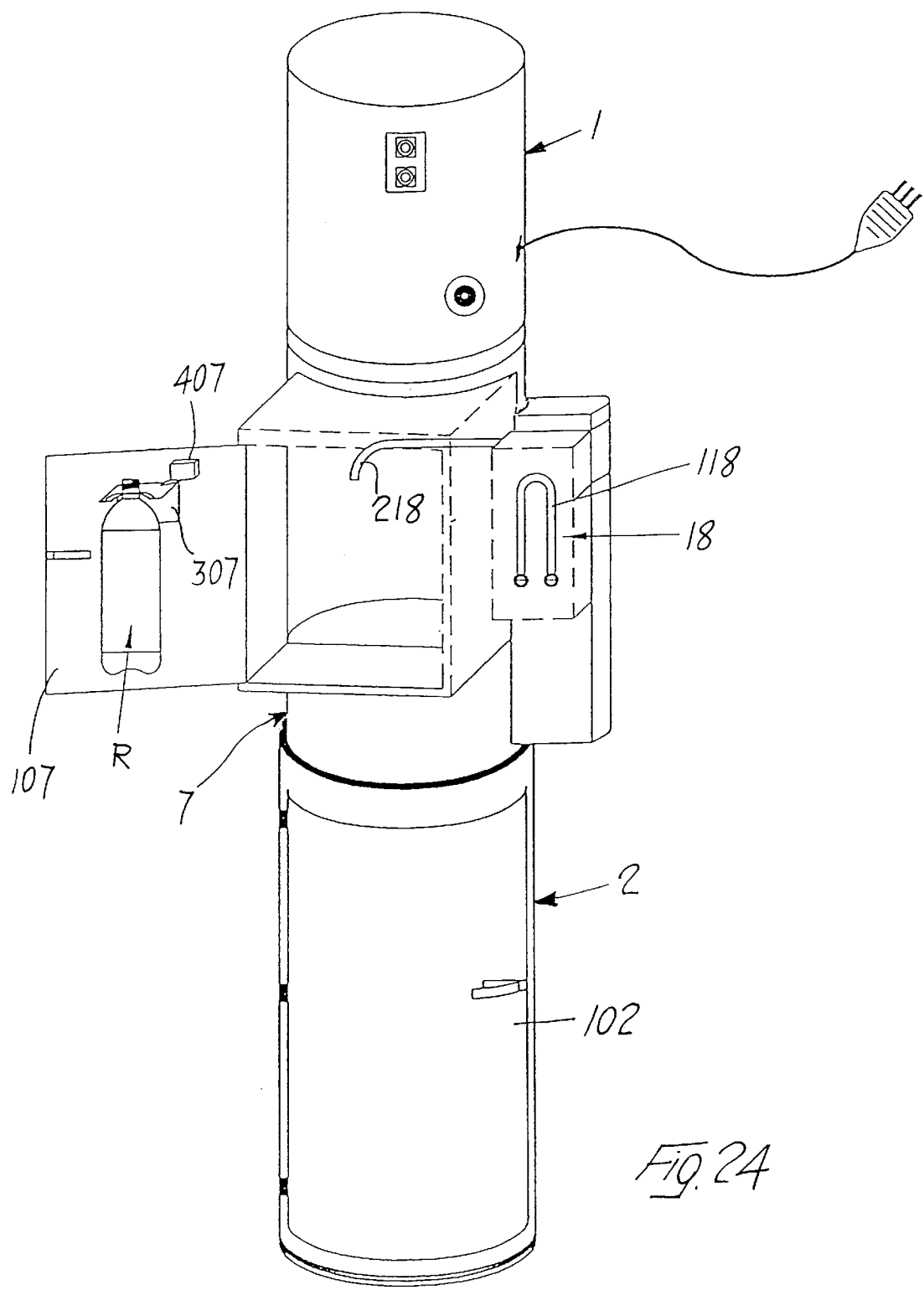
FIGS. 24 and 25 show an embodiment of the device according to the invention in which heat waste pre-treatment means are provided.

The example in FIG. 24 provides a heat treatment, in particular by using steam, as a preliminary treatment of the waste hollow bodies R.

For this purpose, means for steam generation are associated to the intermediate chamber 8, which are globally marked by reference numeral 18 and may consist, for example, of a small boiler to be heated by a heating element 118. A steam supply nozzles extends from the small boiler for engagement with a waste hollow body R mounted in a support 307 on the door 107, whereas steam-flow opening and closing means 407 also mounted on door 107 can be associated with the nozzle 218 and operated from the outside while the door 107 is closed. Heat treatment, either through steam or by other means, can prove to be particularly advantageous with thermoshrinking materials, whereby an at least partial preliminary volume reduction of waste R prior to compaction.

Figure 25:
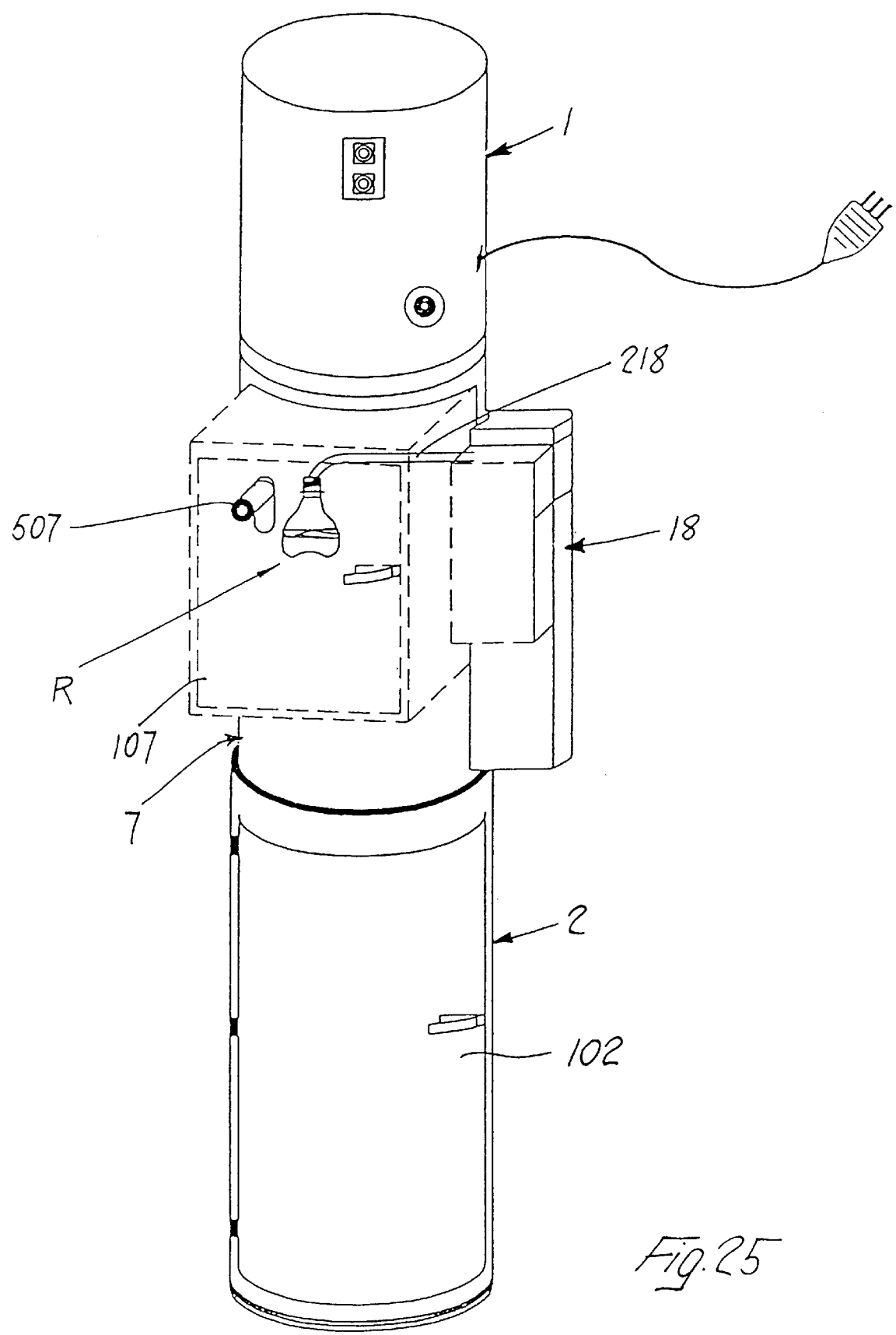

Sterilizing means for wastes R can also be associated with the device according to the invention. These means can be of any type, such as germicide lamps, and other systems, too. In particular, with reference to FIGS. 24 and 25, sterilization may also take place by means of hot steam and/o in combination with substances mixed to steam itself.

With reference to FIGS. 26 to 29, the device according to the invention is illustrated in two alternative versions for differentiated waste collection and compaction. In this case, the compacting unit 1, together with the intermediate chamber 7, if present and/or necessary, as well as with any additional accessories or means which can be associated with the intermediate chamber 7, are mounted on a truck-like bearing structure which is movable along a pre-established path from one to another of several collection stations at which a different collection and compaction container 2 is provided, for example for plastic materials, paper and tins. In each station the compacting unit 1 and the intermediate chamber 7, if any, are brought into coincidence with the corresponding collection and compaction container 2, it being possible to carry out differentiated compaction operations as previously described.

Figure 26:
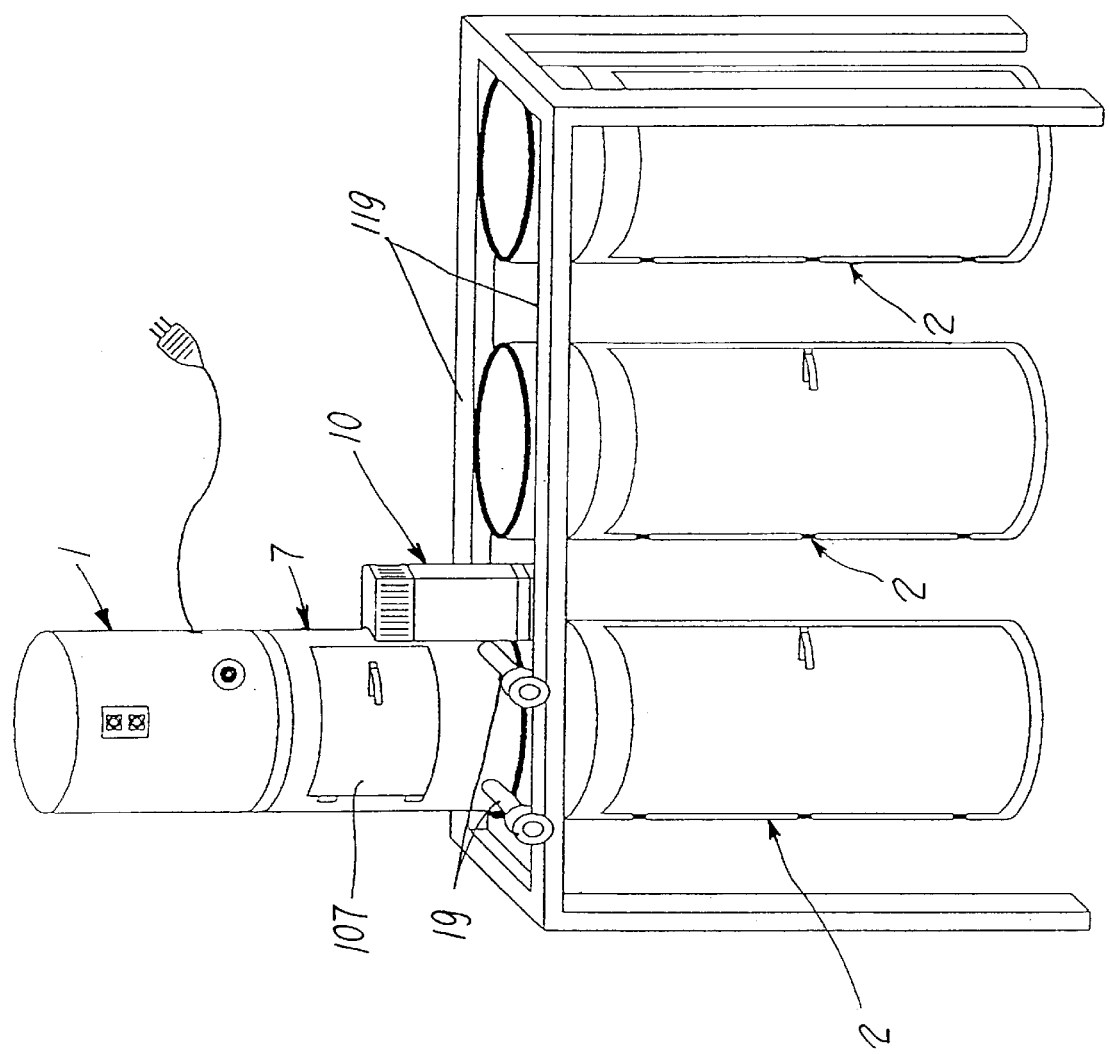
FIGS. 26 and 27 show an embodiments of the device according to the invention for differentiated waste collection and compaction.
Figure 27:
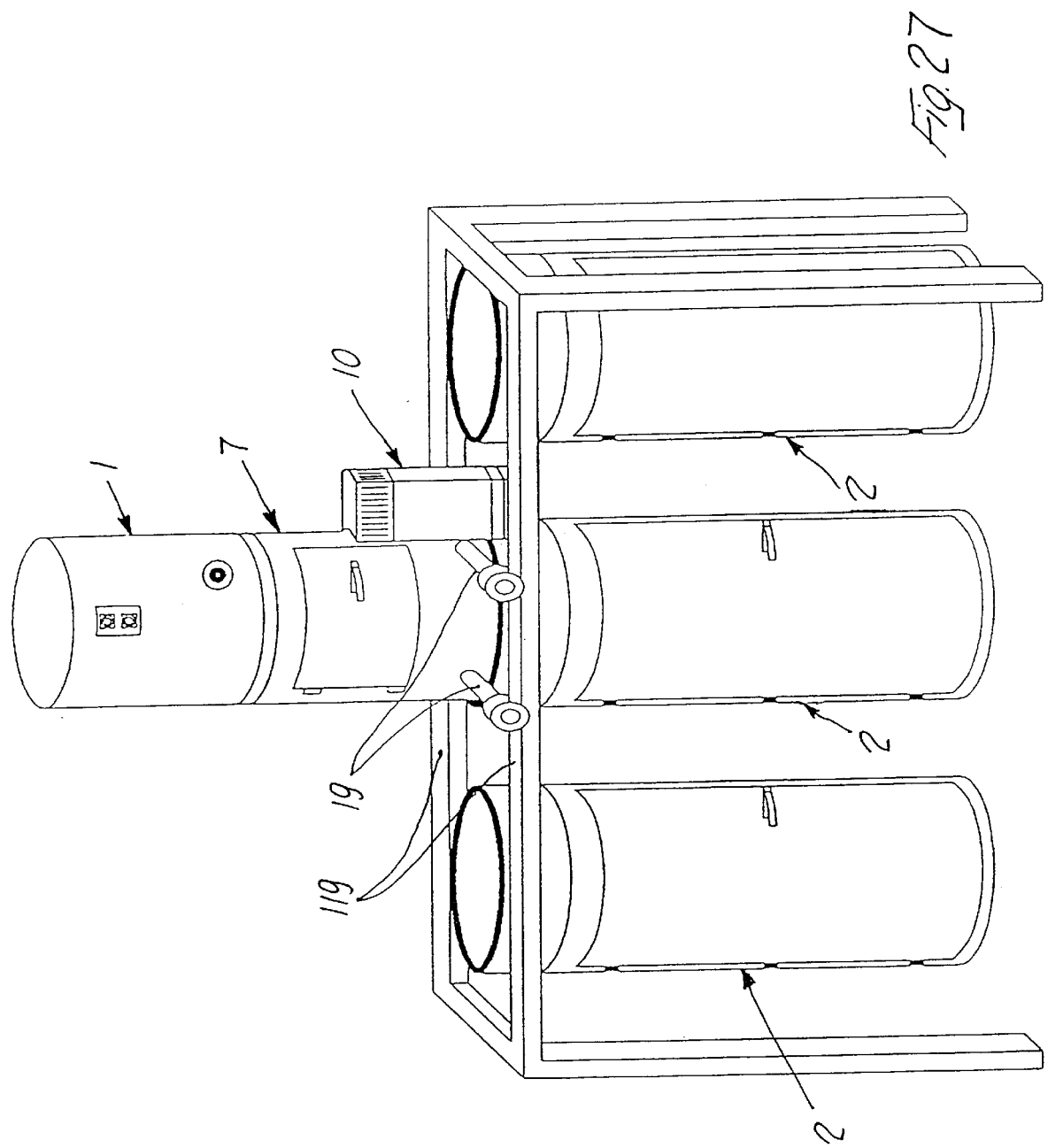
Figure 28:
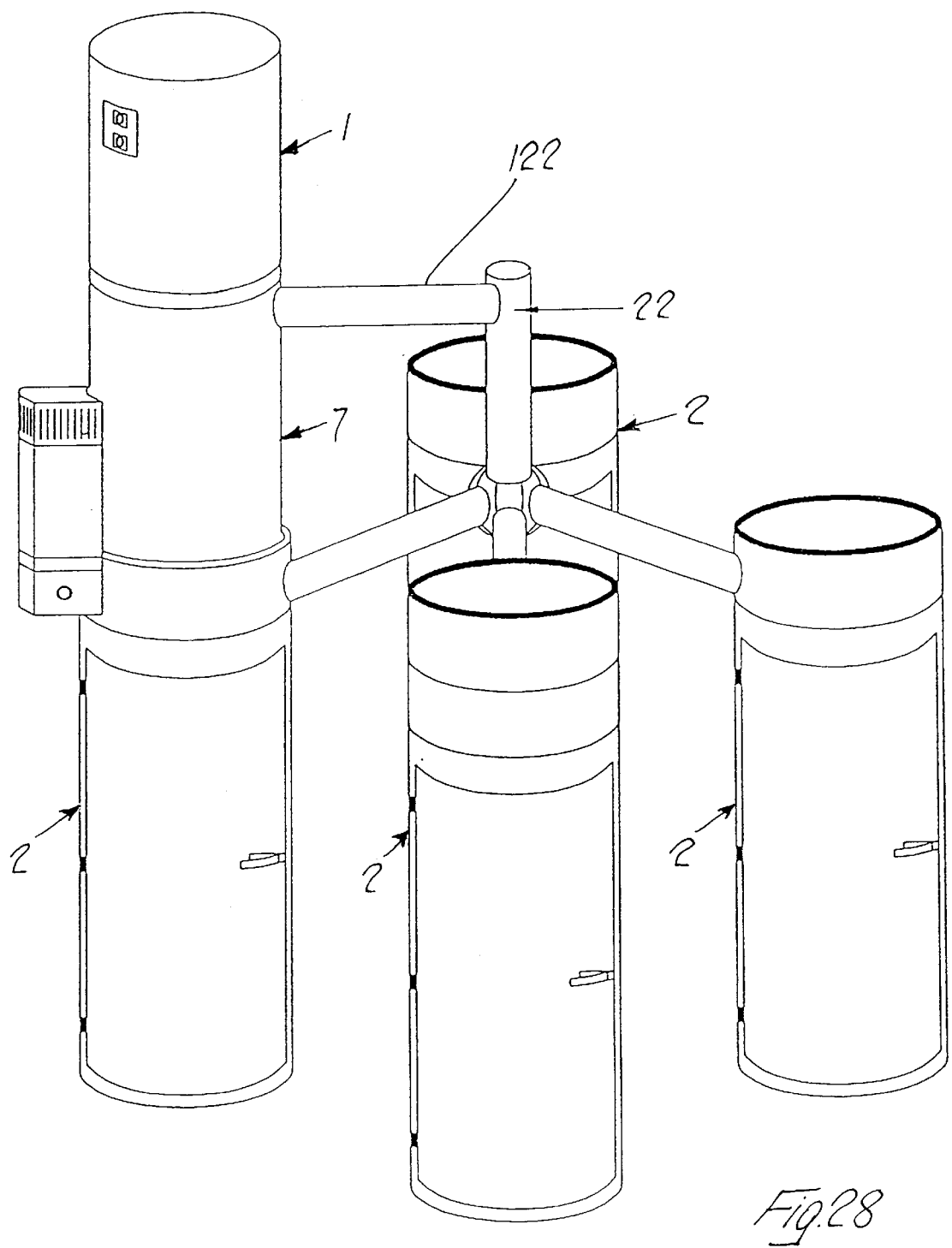
FIGS. 28 and 29 show an arrangement variation of the device according to the preceding FIGS. 26 and 27.
Figure 29:
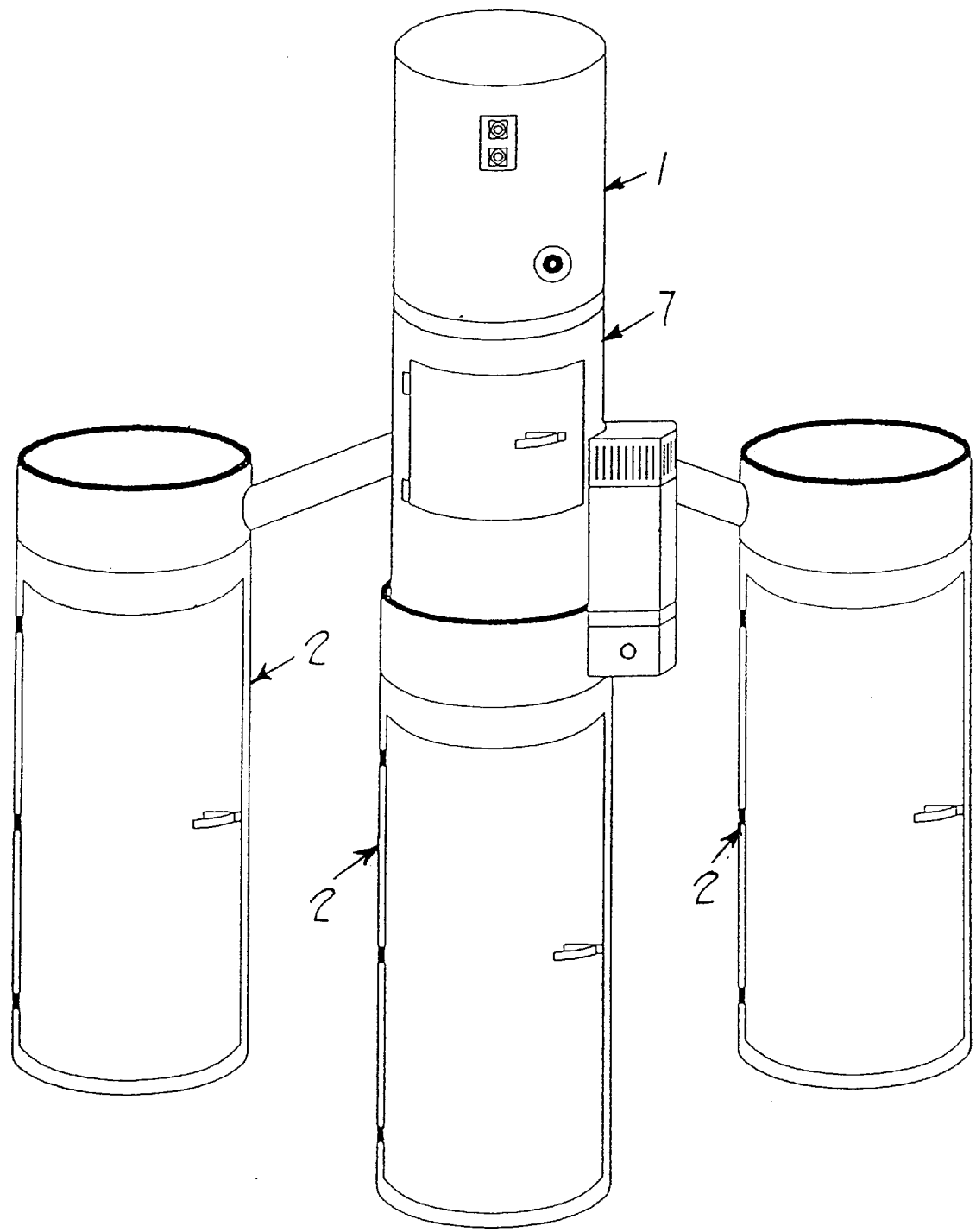
Figure 30:
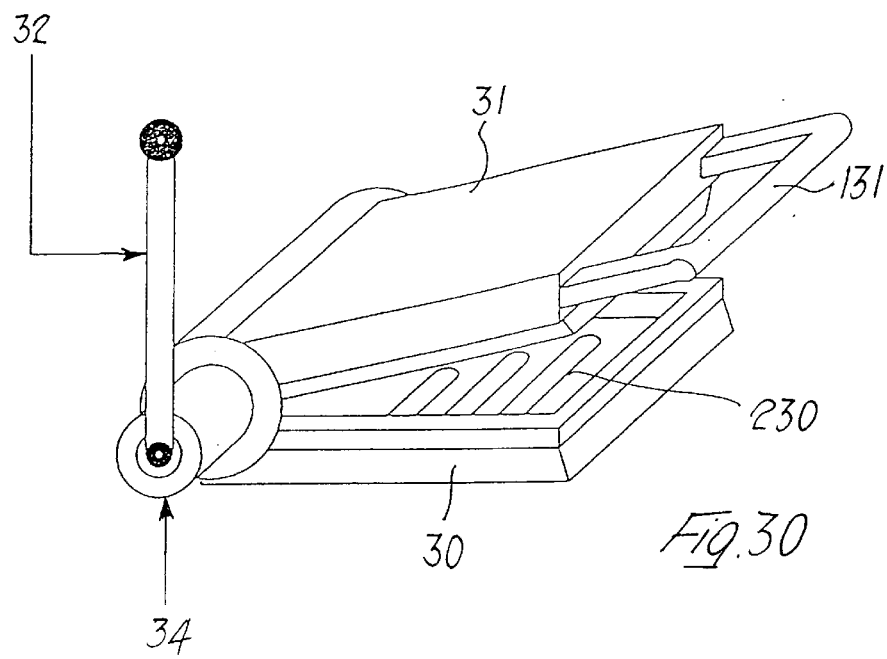
FIGS. 30 to 33 show further embodiments of waste compacting devices according to the invention.
Figure 31:
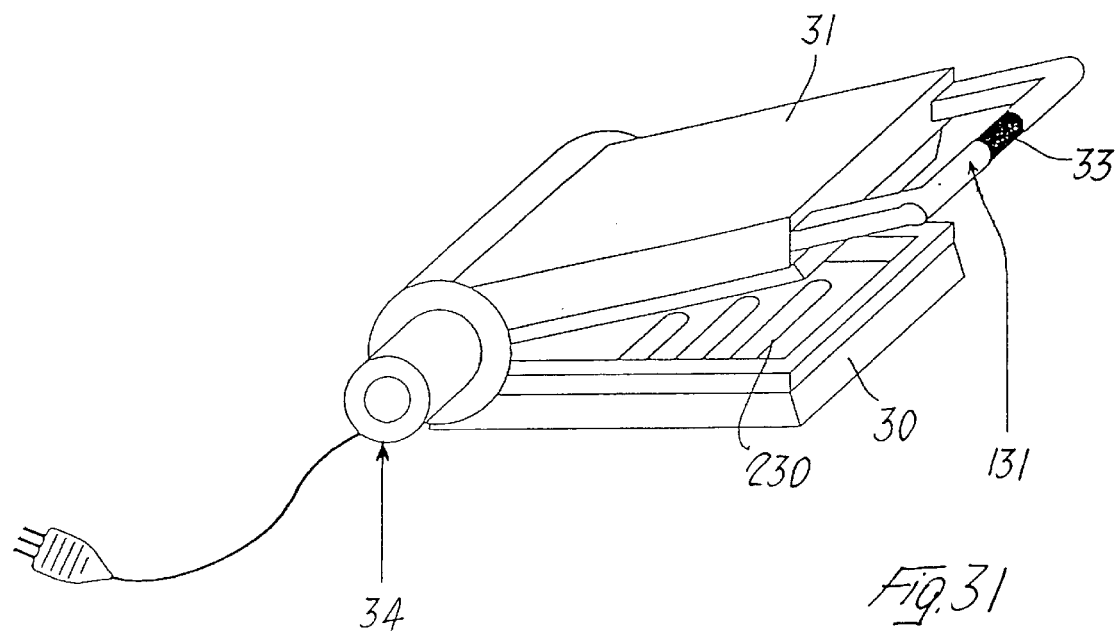
Figure 32:
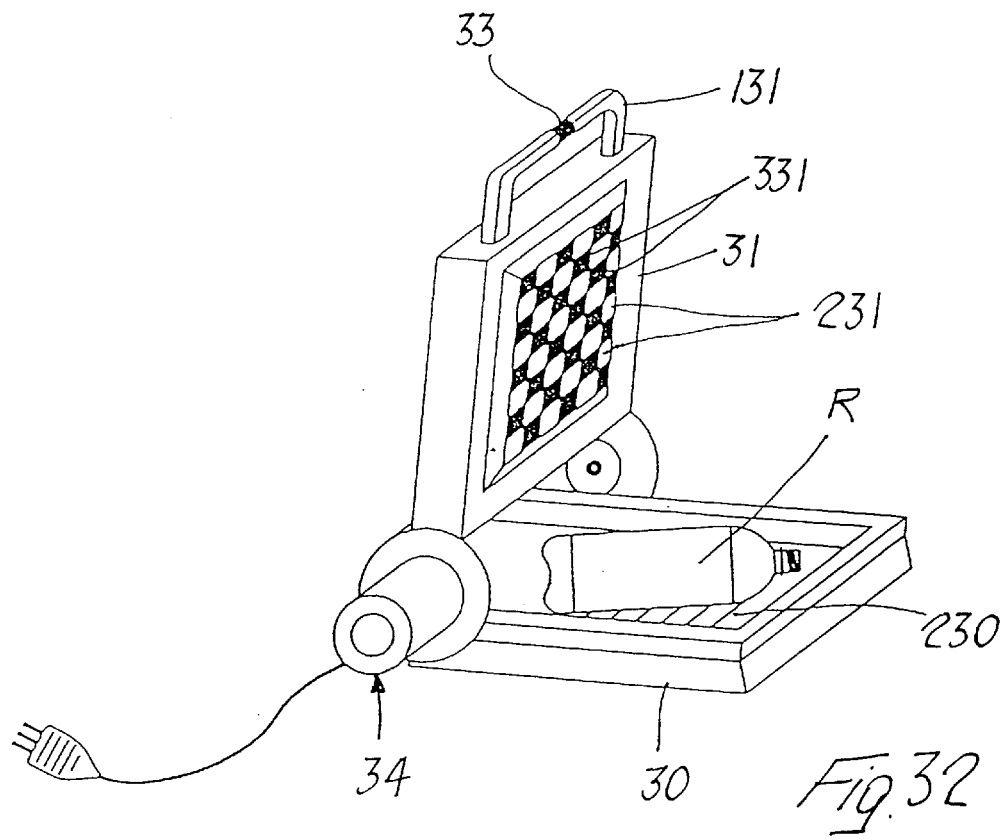
Figure 33:
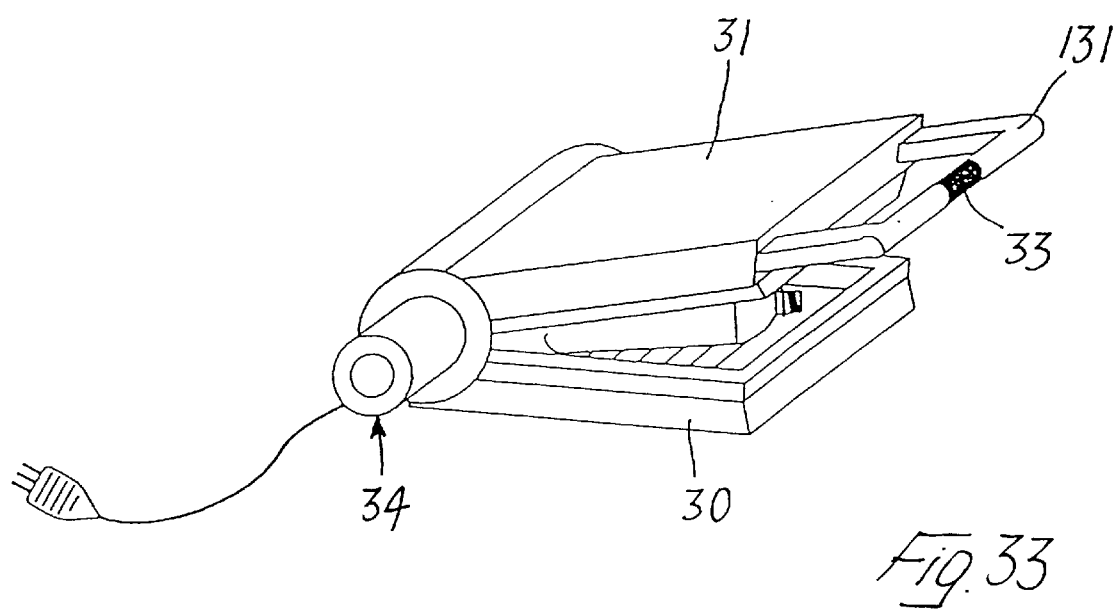

In the example of FIGS. 26 and 27, the compacting unit 1 and the intermediate chamber 7 are mounted on a truck 19 which is movable along horizontal rectilinear guides 119, from one to another of at least two, in particular three or more stations mutually lined up along a straight path. In the example of FIGS. 28 and 29, stations, i.e. the collection and compaction containers 2, are arranged on a circle, whereas the compacting unit 1 and the intermediate chamber 7, if any, are brought on the end of a radial arm 122 of a bearing structure 22 which is pivotable about a vertical axis. Said axis is coaxial to the circle along which the collection and compaction containers 2 are arranged, the arm length being such that the compacting unit 1 and the associated intermediate chamber 7, if any, are in a position which coincides with the respective collection and compaction container 2.

The advantages of the invention clearly result from the above discossion. The main function of the device is to strongly reduce the dimensions of the treated products through a storage stage and a squashing and/or flattening stage. Further improvements allow the above-mentioned minimum stages to be easily completed with crushing, crumbling stages and with preliminary partial squashing and/or flattening, as well as packing, extraction and automatic ejection stages. The system, owing to its modular construction, can be equipped with all or some of the necessary accessories according to requirements, aims and treated products.

According to a further characteristic, following the compaction of a first quantity of collected wastes R, the latter can be kept under the same compaction pressure of the last stage by the same piston in a standstill position or by an additional auxiliary retaining element which succeeds to the piston in the pressure function, letting the latter free for a subsequent filling and compaction stage. This operation can be carried out many times consecutively until the space available in the collection and compaction container is completely filled.

The compacting unit 1 can derive the compacting force from mechanical, hydraulic, oleodynamic principles etc., thanks to hand, pedal, fly-wheel, lever operating means or by motive force and/or combined systems. It is also possible to use the force provided by the expansion of compressed or liquefied gases, as for instance liquid nitrogen, or other suitable suitable gases. Generally, it is possible to use essential transpallet components, truck lifting jacks, hydraulic-type screw or scissor jacks. Drives can be of the lever, handle, or electrical-type or combinations thereof. In particular, in the case of electric-motor drives, mains or battery supply can be provided.

Plates, walls, pistons and additional active surfaces for compaction can be provided with special holes or channel or grooves arranged to accomodate strings, iron wire, plastic lines, glue, etc. which can be used for the final packing of the compacted wastes.

The active compacting surfaces can be further provided with small nails or points to pierce plugged waste hollow bodies to let air or liquids out of them.

Means such as aprons, or the like, for the collection of residual liquids or powder come out of the waste hollow bodies R can be associated with the compacting chamber.

The device according to the invention can be equipped with all the operation and users' protection safety arrangements, such as pressure gauges, pilot lights, photocells, limit switches, dynamometers, safety breakers etc.

The device can be enriched with optional units such as triturators, rotary presses, crumblers, steam or hot air jets or even with a strapping, binding unit and/or with heating elements, microwave generators, power-controlled or manual service equipment.

The tubular jacket of the previous example according to FIGS. 10 to 16 can also consist of a disposable sheath which is preferably made of a compatible material with the ricycling of the wastes packed therein and which can be provided with closing strings.

The final package can further consist of a continuous tubular sheath which, thanks to cutting and closing devices, can be cut to size for the compacted quantity of wastes and closed like a bag. Besides being made of plastic matter sheet, paper, or fabric, the sheath can be made of net-like material.

The packing bags or sheaths of wastes R can also be coloured according to the type of wastes, for differentiated collection thereof.

With reference to a further embodiment as per FIGS. 30 to 33, the compacting device can consist of two plates 30, 31 superimposed and hinged to each other, and provided with handles 131 on the sides opposite to the hinging ones. Compaction takes place following three stages: opening for introduction of waste R between the plates, compacting closure and reopening for extraction of the compacted waste R.

The compression force of the two plates against each other can be multiplied owing to appropriate means 34 such as a piston or a hydraulic, oleodynamic, electrical mechanism etc. or alternatively, screw-, lever-, gear-type mechanical systems or several combined systems. The whole can be operated manually, or by lever 32, pedal, electric push-button 33.

On at least some of their compacting active surfaces, plates 30, 31 can display hollow and/or raised marks 231, 331, 230, for example of the matched type, male and female, for the two opposite plates.

Plates can show even one only mark the shape of which is substantially complementary to the waste hollow bodies, one of which is concave for receiving the hollow body R and the other is convex and complementary for squashing the same.

In the hing free portion, plates 30. 31 can open and close, slide between one or more axes too, upstream or downstream whereof a force multiplicating device can be arranged of a type similar to the above description.

According to a further characteristic, plates 30, 31 can be provided with heating elements to soften plastic materiale to be compacted. Plates 30, 31 can also be provided with blades, points, or the like.

According to an alternative arrangement the two plates can be mutually constrained also in a different way, without hinges, but for example by means of mutual slide guides against each other. In this case, the compacting force can be exerted by screw, piston, scissor means, or by means of systems in which a combination thereof is provided, whereas also in this case operation can be manual or motor driven.

The invention therefore allows for the realization of home systems for inorganic solid waste compaction, which are small, practical, economical, light, may be even portable. With one single machine it is possible to carry out several different operations, such as waste selection (differentiated collection) and maybe treatment, such as, for example, sterilization, reduction, crumbling, squashing, compacting and packing. Thanks to the automatic mechanisms and safety they can be equipped with, these devices considerably facilitate both heterogeneous and differentiated collection of inorganic solid urban wastes such as in particular plastic or other-material bottles, tins, boxes, drums etc. The machine according to the invention favours differentiated collection by product classes (e.g., paper, tins, glasses, etc.) by simply moving the head or the containers. Every family, community, shop or the like, then becomes an efficient laboratory to improve the waste collection, particularly differentiated collection process at its origin, making it more economical and practical.

The cost of compactors according to the invention is particularly low, precisely owing to its modular structure which allows for gradual adjustment and integration of the minimum configuration. Moreover, the cost can be considerably reduced by the possible contribution for sponsorship by the manufacturers of products in disposable containers.

The benefit obtained at the origin and consisting on the one hand of the considerable volume reduction and on the other hand of the more efficient class-differentiated collection directly affects the following waste collection and disposal stages. In particular, throug efficient upstream differentiation, wastes could be conveyed to the various disposal sites according to whether they are to be stored, submitted to ricycling treatments or submitted to incineration.

Obviously, the invention is not limited to the above described and illustrated embodiments but it can be widely varied and modified, especially from the construction point of view, without departing from the above-stated information principle and hereinafter claimed.

I claim:

1. A compacting device for inorganic urban solid waste for reducing sizes and volumes of hollow and bulky bodies, the compacting device having a modular-type construction and comprising:

a collection and compaction container for receiving a package;

a compacting unit removably assembled to the collection and compaction container, the compacting unit including waste compressor means positioned against a stationary striker wall of the compaction container, the compressor means comprising at least one double-acting linear actuator having a rod carrying a compression plate, said compression plate cooperating with an opposite stationary striker surface formed on an opposite side of the collection and compaction container, the compacting unit further comprising a tubular jacket member coaxially movable inside a package in the collection and compaction container in a filling direction thereof, the jacket member being superimposed to an inner side of a peripheral wall of the package when the jacket member is inserted in the package, thereby forming a waste compaction chamber which is not in direct contact with the walls of the package, the compression plate being movable inside the jacket member and capable of remaining inside the package during withdrawal of the tubular jacket member for keeping compacted material in place in the package.

2. A device according to claim 1, further comprising manual or motor-driven means for moving the tubular jacket member independent of the compression plate.

3. The device according to claim 11 wherein said package comprises a bag.

4. The device according to claim 11 wherein the compressor means comprises at least one of a mechanical, hydraulic, oleodynamic, and pneumatic-type means using force provided by compressed or liquified gases.

* * * * *